US010315641B2

(12) United States Patent
Kato

(10) Patent No.: US 10,315,641 B2
(45) Date of Patent: Jun. 11, 2019

(54) HYBRID VEHICLE AND TRAVEL MODE SETTING METHOD OF HYBRID VEHICLE

(75) Inventor: Norihiko Kato, Handa (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1154 days.

(21) Appl. No.: 13/322,349

(22) PCT Filed: May 26, 2009

(86) PCT No.: PCT/JP2009/059621
§ 371 (c)(1),
(2), (4) Date: Nov. 23, 2011

(87) PCT Pub. No.: WO2010/137119
PCT Pub. Date: Dec. 2, 2010

(65) Prior Publication Data
US 2012/0065828 A1 Mar. 15, 2012

(51) Int. Cl.
B60K 6/00 (2006.01)
B60L 3/00 (2019.01)
(Continued)

(52) U.S. Cl.
CPC ............. B60W 20/10 (2013.01); B60K 6/365 (2013.01); B60K 6/445 (2013.01); B60K 6/52 (2013.01);
(Continued)

(58) Field of Classification Search
CPC . B60K 1/04; B60K 6/445; B60K 6/48; B60K 6/547; B60K 6/46; B60K 6/52;
(Continued)

(56) References Cited

U.S. PATENT DOCUMENTS 6,242,873 B1 * 6/2001 Drozdz .................... B60K 6/46
180/65.1
6,814,170 B2 * 11/2004 Abe et al. ................. 180/65.25
(Continued)

FOREIGN PATENT DOCUMENTS

JP 2005295644 A * 10/2005
JP 2007-062640 A 3/2007
(Continued)

OTHER PUBLICATIONS

Mains_Electrcity, [retrieved on Oct. 8, 2013]. Retrieved from the Internet:< URL: http://en.wikipedia.org/wiki/Mains_electricity.*
(Continued)

Primary Examiner — Adam D Tissot
Assistant Examiner — Aaron C Smith
(74) Attorney, Agent, or Firm — Hunton Andrews Kurth LLP

(57) ABSTRACT

In the case that there is the charge record of the charger at the system startup time, the motor travel priority mode is set as the travel mode when the accumulated charge ration SOC is more than or equal to the threshold value Sev, and the hybrid travel priority mode is set as the travel mode when the accumulated charge ratio SOC is less than the threshold value Sev. In the case that there is no charge record of the charger, the travel mode is set in the same way as the case that there is the charge record when the hybrid travel shift flag Fhv is equal to value '0', and the hybrid travel priority mode is set as the travel mode when the hybrid travel shift flag Fhv is equal to value '1'.

10 Claims, 13 Drawing Sheets

(51) Int. Cl.

| | | |
|---|---|---|
| *B60L 7/10* | (2006.01) | |
| *B60L 58/00* | (2019.01) | |
| *B60L 58/10* | (2019.01) | |
| *B60L 58/12* | (2019.01) | |
| *B60L 58/14* | (2019.01) | |
| *B60W 20/10* | (2016.01) | |
| *B60W 10/26* | (2006.01) | |
| *B60K 6/365* | (2007.10) | |
| *B60K 6/445* | (2007.10) | |
| *B60K 6/52* | (2007.10) | |
| *B60K 6/547* | (2007.10) | |
| *B60L 11/18* | (2006.01) | |
| *B60W 10/06* | (2006.01) | |
| *B60W 10/08* | (2006.01) | |
| *B60W 20/00* | (2016.01) | |
| *B60K 1/02* | (2006.01) | |

(52) U.S. Cl.
CPC .......... *B60K 6/547* (2013.01); *B60L 11/1861* (2013.01); *B60W 10/06* (2013.01); *B60W 10/08* (2013.01); *B60W 10/26* (2013.01); *B60W 20/00* (2013.01); *B60K 1/02* (2013.01); *B60W 2510/244* (2013.01); *B60W 2520/10* (2013.01); *B60W 2540/10* (2013.01); *B60W 2540/12* (2013.01); *Y02T 10/6239* (2013.01); *Y02T 10/6265* (2013.01); *Y02T 10/6269* (2013.01); *Y02T 10/6286* (2013.01); *Y02T 10/7005* (2013.01); *Y02T 10/705* (2013.01); *Y02T 10/7044* (2013.01)

(58) Field of Classification Search
CPC ......... B60K 1/02; B60W 10/26; B60W 20/00; B60W 10/08; B60W 10/06; B60W 20/10; B60W 2510/244; B60W 2520/10; B60W 2540/10; B60W 2540/12; B60L 11/14; B60L 11/18; B60L 3/00; B60L 3/0046; B60L 11/1861; G06F 19/00; G05D 1/00; Y02T 10/6286; Y02T 10/6239; Y02T 10/6269; Y02T 10/7005; Y02T 10/7044; Y02T 10/705; G01R 31/006; H02J 7/1423
USPC ............... 180/65.235, 65.28, 65.285, 65.29; 320/109; 903/906; 701/22
See application file for complete search history.

(56) References Cited

U.S. PATENT DOCUMENTS

| | | | | |
|---|---|---|---|---|
| 6,856,866 | B2* | 2/2005 | Nakao | 701/22 |
| 6,861,957 | B2* | 3/2005 | Koike | 340/903 |
| 6,986,398 | B2* | 1/2006 | Obayashi | 180/65.28 |
| 7,291,093 | B2* | 11/2007 | Yamamoto et al. | 477/110 |
| 7,665,559 | B2* | 2/2010 | De La Torre-Bueno | 180/65.29 |
| 7,736,265 | B2* | 6/2010 | Yamamoto et al. | 477/3 |
| 7,764,051 | B2* | 7/2010 | Ishikawa et al. | 322/29 |
| 7,847,495 | B2* | 12/2010 | Oyobe et al. | 318/53 |
| 7,925,426 | B2* | 4/2011 | Koebler et al. | 701/123 |
| 7,938,208 | B2* | 5/2011 | Oba et al. | 180/65.225 |
| 7,953,525 | B2* | 5/2011 | Oyobe et al. | 701/22 |
| 7,958,958 | B2* | 6/2011 | de la Torre Bueno | 180/65.29 |
| 8,088,035 | B2* | 1/2012 | Yamamoto | 477/3 |
| 8,100,207 | B2* | 1/2012 | Oba et al. | 180/65.285 |
| 8,186,465 | B2* | 5/2012 | Oyobe et al. | 180/65.275 |
| 8,188,710 | B2* | 5/2012 | Ichikawa et al. | 320/109 |
| 8,229,612 | B2* | 7/2012 | Itoh et al. | 701/22 |
| 8,231,491 | B2* | 7/2012 | Oba et al. | 475/5 |
| 8,442,727 | B2* | 5/2013 | Yamamoto et al. | 701/49 |
| 2002/0188387 | A1* | 12/2002 | Woestman et al. | 701/22 |
| 2008/0262668 | A1* | 10/2008 | Yamada | B60K 6/46 701/22 |
| 2009/0062063 | A1* | 3/2009 | Yamanaka et al. | 477/5 |
| 2009/0306842 | A1* | 12/2009 | Oyobe et al. | 701/22 |
| 2010/0145560 | A1 | 6/2010 | Komatsu et al. | |
| 2010/0280687 | A1* | 11/2010 | Tate, Jr. | B60W 10/06 701/22 |
| 2012/0072063 | A1* | 3/2012 | Kato et al. | 701/22 |
| 2012/0072066 | A1* | 3/2012 | Kato et al. | 701/22 |

FOREIGN PATENT DOCUMENTS

| | | |
|---|---|---|
| JP | 2007-238022 A | 9/2007 |
| JP | 2009-018713 A | 1/2009 |
| JP | 2009-101735 A | 5/2009 |
| WO | 2009008546 A1 | 1/2009 |

OTHER PUBLICATIONS

Electricity around the world, [retrieved on Oct. 8, 2013]. Retrieved from the Internet:< URL: http://www.worldstandards.eu/electricity.htm.*

Condenser, [retrieved on Oct. 8, 2013]. Retrieved from the Internet:< URL: http://www.thefreedictionary.com/condenser.*

PID controller, [retrieved on Oct. 8, 2013]. Retrieved from the Internet:< URL: http://en.wikipedia.org/wiki/PID_controller.*

Japanese Patent Office, International Search Report in International Application No. PCT/JP2009/059621, dated Aug. 25, 2009.

* cited by examiner

HYBRID VEHICLE AND TRAVEL MODE SETTING METHOD OF HYBRID VEHICLE

CROSS REFERENCE TO RELATED APPLICATION

This is a 371 national phase application of PCT/JP2009/059621 filed May 26, 2009, the content of which is incorporated herein by reference in its entirety.

TECHNICAL FIELD

The present invention relates to a hybrid vehicle and a travel mode setting method of a hybrid vehicle. More specifically, the invention pertains to a hybrid vehicle having an internal combustion engine capable of outputting power for driving the hybrid vehicle, a motor constructed to input and output power for driving the hybrid vehicle, a secondary battery designed to transmit electric power to and from the motor, and a charger connected to an external power supply in a system shutdown state of the hybrid vehicle to charge the secondary battery with electric power from the external power supply, the hybrid vehicle being capable of motor travel where the hybrid vehicle is driven only with input and output power to and from the motor and hybrid travel where the hybrid vehicle is driven with output power from the internal combustion engine and with the input and output power to and from the motor, and a travel mode setting method of such a hybrid vehicle.

BACKGROUND ART

One proposed hybrid vehicle has an engine, two motor generators, a battery that transmits electric power to and from the two motor generators, and a charging unit that charges the battery by applying electric power from an external power supply to the neutral point of the two motor generators. The proposed hybrid vehicle is driven with the motor generators in operation stop of the engine until the SOC of the battery fully charged with the electric power from the external power supply reaches a target SOC, and driven with the engine and the motor generators when the SOC of the battery reaches the target SOC (see, for example, Patent Document 1). In this hybrid vehicle, the SOC of the battery when the vehicle arrives at the destination is brought to the target SOC according to the above described control.

PRIOR ART DOCUMENT

Patent Document

Patent Document 1: Japanese Patent Laid-Open No. 2007-62640

SUMMARY OF THE INVENTION

In a hybrid vehicle, such as the above described hybrid vehicle, capable of charging the battery with the electric power from the external power supply in a system shutdown state of the vehicle, the battery is charged every time the system shutdown is performed. The hybrid vehicle is thus preferred to be driven with a higher priority given to the motor travel where the hybrid vehicle is driven only with the output power from the motor in operation stop of the engine to lower the accumulated charge amount in the battery by the system shutdown, though it is not always the case that the battery is charged with the external power supply in the system shutdown state. In the case that the battery is not charged in the system shutdown state, it is required at the system startup to determine appropriately whether the motor travel is prioritized for driving the hybrid vehicle or the hybrid travel is prioritized for driving the hybrid vehicle. There is also a case that the hybrid vehicle is preferred to be driven with the output power from the engine without using the electric power from the battery to put the accumulated charge amount in the battery aside for driving in areas where only the motor travel is permitted for the natural environment and the urban environment.

In a hybrid vehicle and a travel mode setting method of a hybrid vehicle of the invention, the main object of the invention is to set a more appropriate travel mode.

In order to attain the main object, the hybrid vehicle and the travel mode setting method of the hybrid vehicle of the invention have the configurations discussed below.

According to one aspect, the present invention is directed to a hybrid vehicle. The hybrid vehicle, having an internal combustion engine capable of outputting power for driving the hybrid vehicle, a motor constructed to input and output power for driving the hybrid vehicle, a secondary battery designed to transmit electric power to and from the motor, and a charger connected to an external power supply in a system shutdown state of the hybrid vehicle to charge the secondary battery with electric power from the external power supply, the hybrid vehicle being capable of motor travel where the hybrid vehicle is driven only with input and output power to and from the motor and hybrid travel where the hybrid vehicle is driven with output power from the internal combustion engine and with the input and output power to and from the motor, the hybrid vehicle having: an accumulated charge ratio calculation module configured to calculate an accumulated charge ratio that is a ratio of an accumulated charge amount in the secondary battery to a whole capacity of the secondary battery; a travel mode setting module configured to set a motor travel priority mode where the motor travel is prioritized for driving the hybrid vehicle as a travel mode when the calculated accumulated charge ratio is more than or equal to a first preset ratio at system startup of the hybrid vehicle in which the secondary battery is charged by the charger after system shutdown of the hybrid vehicle, set a hybrid travel priority mode where the hybrid travel is prioritized for driving the hybrid vehicle as the travel mode when the calculated accumulated charge ratio is less than the first preset ratio at the system startup of the hybrid vehicle in which the secondary battery is charged by the charger after the system shutdown of the hybrid vehicle, set the hybrid travel priority mode as the travel mode when the accumulated charge ratio becomes less than a second preset ratio that is less than the first preset ratio while the hybrid vehicle is driven in the motor travel priority mode, set the motor travel priority mode as the travel mode at the system startup of the hybrid vehicle in which the secondary battery is not charged by the charger after the system shutdown of the hybrid vehicle in which the motor travel priority mode is set as the travel mode, and set the hybrid travel priority mode as the travel mode regardless of the calculated accumulated charge ratio at the system startup of the hybrid vehicle in which the secondary battery is not charged by the charger after the system shutdown of the hybrid vehicle in which the hybrid travel priority mode is set as the travel mode according to the calculated accumulated charge ratio becoming less than the second preset ratio; and a control module configured to control the internal combustion engine and the motor so that the hybrid vehicle is driven in the set travel mode.

The hybrid vehicle according to this aspect of the invention sets a motor travel priority mode as a travel mode when an accumulated charge ratio that is a ratio of an accumulated charge amount in the secondary battery to a whole capacity of the secondary battery is more than or equal to a first preset ratio at system startup of the hybrid vehicle in which the secondary battery is charged by the charger after system shutdown of the hybrid vehicle, while setting a hybrid travel priority mode as the travel mode when the accumulated charge ratio is less than the first preset ratio at the system startup of the hybrid vehicle in which the secondary battery is charged by the charger after the system shutdown of the hybrid vehicle, and setting the hybrid travel priority mode as the travel mode when the accumulated charge ratio becomes less than a second preset ratio that is less than the first preset ratio while the hybrid vehicle is driven in the motor travel priority mode. The described setting of the travel mode enables to set the motor travel priority mode in the case that the hybrid vehicle is able to perform the motor travel to some extent of time or distance, and enables to set the hybrid travel priority mode in the case that the hybrid vehicle should be switched to be driven in the hybrid travel priority mode after the hybrid vehicle is driven in the motor travel priority mode for a short time or distance even when the motor travel priority mode is set for driving the hybrid vehicle, also in the case when the accumulated charge ratio reaches a ratio which is not appropriate to the motor travel. The hybrid vehicle sets the motor travel priority mode as the travel mode at the system startup of the hybrid vehicle in which the secondary battery is not charged by the charger after the system shutdown of the hybrid vehicle in which the motor travel priority mode is set as the travel mode. This setting enables to maintain the travel mode at the system shutdown in the motor travel priority mode. The hybrid vehicle sets the hybrid travel priority mode as the travel mode regardless of the calculated accumulated charge ratio at the system startup of the hybrid vehicle in which the secondary battery is not charged by the charger after the system shutdown of the hybrid vehicle in which the hybrid travel priority mode is set as the travel mode according to the calculated accumulated charge ratio becoming less than the second preset ratio. This setting enables to maintain the travel mode at the system shutdown in the hybrid travel priority mode.

In one preferable application of the hybrid vehicle, the travel mode setting module may be configured to set the hybrid travel priority mode as the travel mode when the calculated accumulated charge ratio is less than a third preset ratio at the system startup of the hybrid vehicle in which the secondary battery is not charged by the charger after the system shutdown of the hybrid vehicle in which the motor travel priority mode is set as the travel mode. This setting enables to cope with the case that the accumulated charge ratio is decreased due to self-discharge of the secondary battery. In this hybrid vehicle, the 'third preset ratio' may be the first preset ratio and may be the second preset ratio.

In another preferable application of the hybrid vehicle of the invention, the hybrid vehicle may further have: a hybrid setting cancellation instruction module configured to give instructions for a hybrid setting that is a setting of the hybrid travel priority mode and for a cancellation of the hybrid setting. In this hybrid vehicle, the travel mode setting module is configured to set the hybrid travel priority mode as the travel mode when the instruction for the hybrid setting is given by the hybrid setting cancellation instruction module while the hybrid vehicle is driven in the motor travel priority mode, and set the motor travel priority mode as the travel mode when the instruction for the cancellation of the hybrid setting is given by the hybrid setting cancellation instruction module while the hybrid vehicle is driven in the hybrid travel priority mode according to the instruction for the hybrid setting by the hybrid setting cancellation instruction module. This arrangement enables to set the travel mode reflecting the driver's intention. As a result, it is enabled to put the accumulated charge amount in the secondary battery aside for driving in areas where only the motor travel is permitted for the natural environment or the urban environment.

In one preferable application of the arrangement of the hybrid vehicle of the invention, having the hybrid setting cancellation instruction module, the travel mode setting module may be configured to set the motor travel priority mode as the travel mode when the calculated accumulated charge ratio is more than or equal to the first preset ratio, while setting the hybrid travel priority mode as the travel mode when the calculated accumulated charge ratio is less than the first preset ratio, at the system startup of the hybrid vehicle in which the secondary battery is not charged by the charger after the system shutdown, without the instruction for the cancellation of the hybrid setting by the hybrid setting cancellation instruction module, of the hybrid vehicle in which the hybrid travel priority mode is set according to the instruction for the hybrid setting by the hybrid setting cancellation instruction module. This arrangement enables to set the default travel mode at the system startup regardless of the setting of the travel mode by the driver before the system shutdown, and enables to cope with the case that the driver forgets to cancel the hybrid setting before the system shutdown.

In one preferable application of the arrangement of the hybrid vehicle of the invention, having the hybrid setting cancellation instruction module, the travel mode setting module may be configured to set the hybrid travel priority mode as the travel mode at the system startup of the hybrid vehicle in which the secondary battery is not charged by the charger after the system shutdown, without the instruction for the cancellation of the hybrid setting by the hybrid setting cancellation instruction module, of the hybrid vehicle in which the hybrid travel priority mode is set according to the instruction for the hybrid setting by the hybrid setting cancellation instruction module. This arrangement enables to reflect the driver's intention of the travel mode setting at the system startup after the system shutdown.

In one preferable application of the arrangement of the hybrid vehicle of the invention, having the hybrid setting cancellation instruction module, the travel mode setting module may be configured to set the motor travel priority mode as the travel mode when the calculated accumulated charge ratio is more than or equal to the first preset ratio, while setting the hybrid travel priority mode as the travel mode when the calculated accumulated charge ratio is less than the first preset ratio, at the system startup of the hybrid vehicle in which the secondary battery is charged by the charger after the system shutdown, without the instruction for the cancellation of the hybrid setting by the hybrid setting cancellation instruction module, of the hybrid vehicle in which the hybrid travel priority mode is set according to the instruction for the hybrid setting by the hybrid setting cancellation instruction module. This arrangement enables to set the default travel mode at the system startup regardless of the setting of the travel mode by the driver before the system shutdown, and enables to cope with the case that the driver forgets to cancel the hybrid setting before the system shutdown.

In one preferable application of the arrangement of the hybrid vehicle of the invention, having the hybrid setting cancellation instruction module, the travel mode setting module may be configured to set the hybrid travel priority mode as the travel mode at the system startup of the hybrid vehicle in which the secondary battery is charged by the charger after the system shutdown, without the instruction for the cancellation of the hybrid setting by the hybrid setting cancellation instruction module, of the hybrid vehicle in which the hybrid travel priority mode is set according to the instruction for the hybrid setting by the hybrid setting cancellation instruction module. This arrangement enables to reflect the driver's intention of the travel mode setting at the system startup after the system shutdown.

In one preferable application of the arrangement of the hybrid vehicle of the invention, having the hybrid setting cancellation instruction module, the travel mode setting module may be configured to set the motor travel priority mode as the travel mode when the calculated accumulated charge ratio is more than or equal to the first preset ratio, while setting the hybrid travel priority mode as the travel mode when the calculated accumulated charge ratio is less than the first preset ratio, at the system startup of the hybrid vehicle after the system shutdown, without the instruction for the cancellation of the hybrid setting by the hybrid setting cancellation instruction module, of the hybrid vehicle in which the hybrid travel priority mode is set according to the instruction for the hybrid setting by the hybrid setting cancellation instruction module. This arrangement enables to set the default travel mode at the system startup regardless of the setting of the travel mode by the driver before the system shutdown, and enables to cope with the case that the driver forgets to cancel the hybrid setting before the system shutdown.

In one preferable application of the arrangement of the hybrid vehicle of the invention, having the hybrid setting cancellation instruction module, the travel mode setting module may be configured to set the hybrid travel priority mode as the travel mode at the system startup of the hybrid vehicle after the system shutdown, without the instruction for the cancellation of the hybrid setting by the hybrid setting cancellation instruction module, of the hybrid vehicle in which the hybrid travel priority mode is set according to the instruction for the hybrid setting by the hybrid setting cancellation instruction module. This arrangement enables to reflect the driver's intention of the travel mode setting at the system startup after the system shutdown.

According to another aspect, the present invention is directed to a travel mode setting method of a hybrid vehicle having an internal combustion engine capable of outputting power for driving the hybrid vehicle, a motor constructed to input and output power for driving the hybrid vehicle, a secondary battery designed to transmit electric power to and from the motor, a charger connected to an external power supply in a system shutdown state of the hybrid vehicle to charge the secondary battery with electric power from the external power supply, and a travel control module configured to control the internal combustion engine and the motor so that the hybrid vehicle is driven in one set travel mode between a motor travel priority mode, where a motor travel that the hybrid vehicle is driven only with input and output power to and from the motor is prioritized for driving the hybrid vehicle, and a hybrid travel priority mode, where a hybrid travel that the hybrid vehicle is driven with output power from the internal combustion engine and with the input and output power to and from the motor is prioritized for driving the hybrid vehicle. The travel mode setting method including: setting the motor travel priority mode as the travel mode when an accumulated charge ratio is more than or equal to a first preset ratio at system startup of the hybrid vehicle in which the secondary battery is charged by the charger after system shutdown of the hybrid vehicle, the accumulated charge ratio being a ratio of an accumulated charge amount in the secondary battery to a whole capacity of the secondary battery, setting the hybrid travel priority mode as the travel mode when the accumulated charge ratio is less than the first preset ratio at the system startup of the hybrid vehicle in which the secondary battery is charged by the charger after the system shutdown of the hybrid vehicle, setting the hybrid travel priority mode as the travel mode when the accumulated charge ratio becomes less than a second preset ratio that is less than the first preset ratio while the hybrid vehicle is driven in the motor travel priority mode, setting the motor travel priority mode as the travel mode at the system startup of the hybrid vehicle in which the secondary battery is not charged by the charger after the system shutdown of the hybrid vehicle in which the motor travel priority mode is set as the travel mode, and setting the hybrid travel priority mode as the travel mode regardless of the accumulated charge ratio at the system startup of the hybrid vehicle in which the secondary battery is not charged by the charger after the system shutdown of the hybrid vehicle in which the hybrid travel priority mode is set as the travel mode according to the accumulated charge ratio becoming less than the second preset ratio.

The travel mode setting method of the hybrid vehicle according to this aspect of the invention, sets a motor travel priority mode as a travel mode when an accumulated charge ratio that is a ratio of an accumulated charge amount in the secondary battery to a whole capacity of the secondary battery is more than or equal to a first preset ratio at system startup of the hybrid vehicle in which the secondary battery is charged by the charger after system shutdown of the hybrid vehicle, while setting a hybrid travel priority mode as the travel mode when the accumulated charge ratio is less than the first preset ratio at the system startup of the hybrid vehicle in which the secondary battery is charged by the charger after the system shutdown of the hybrid vehicle, and setting the hybrid travel priority mode as the travel mode when the accumulated charge ratio becomes less than a second preset ratio that is less than the first preset ratio while the hybrid vehicle is driven in the motor travel priority mode. The described setting of the travel mode enables to set the motor travel priority mode in the case that the hybrid vehicle is able to perform the motor travel to some extent of time or distance, and enables to set the hybrid travel priority mode in the case that the hybrid vehicle should be switched to be driven in the hybrid travel priority mode after the hybrid vehicle is driven in the motor travel priority mode for a short time or distance even when the motor travel priority mode is set for driving the hybrid vehicle, also in the case when the accumulated charge ratio reaches a ratio which is not appropriate to the motor travel. The travel mode setting method sets the motor travel priority mode as the travel mode at the system startup of the hybrid vehicle in which the secondary battery is not charged by the charger after the system shutdown of the hybrid vehicle in which the motor travel priority mode is set as the travel mode. This setting enables to maintain the travel mode at the system shutdown in the motor travel priority mode. The travel mode setting method sets the hybrid travel priority mode as the travel mode regardless of the calculated accumulated charge ratio at the system startup of the hybrid vehicle in which the secondary battery is not charged by the charger after the system shutdown of the hybrid vehicle in which the hybrid travel priority mode is set as the travel mode according to the calculated accumulated charge ratio becoming less than the second preset ratio. This setting enables to maintain the travel mode at the system shutdown in the hybrid travel priority mode.

MODES FOR CARRYING OUT THE INVENTION

One mode for carrying out the invention is discussed below as a preferred embodiment.

Figure 1:
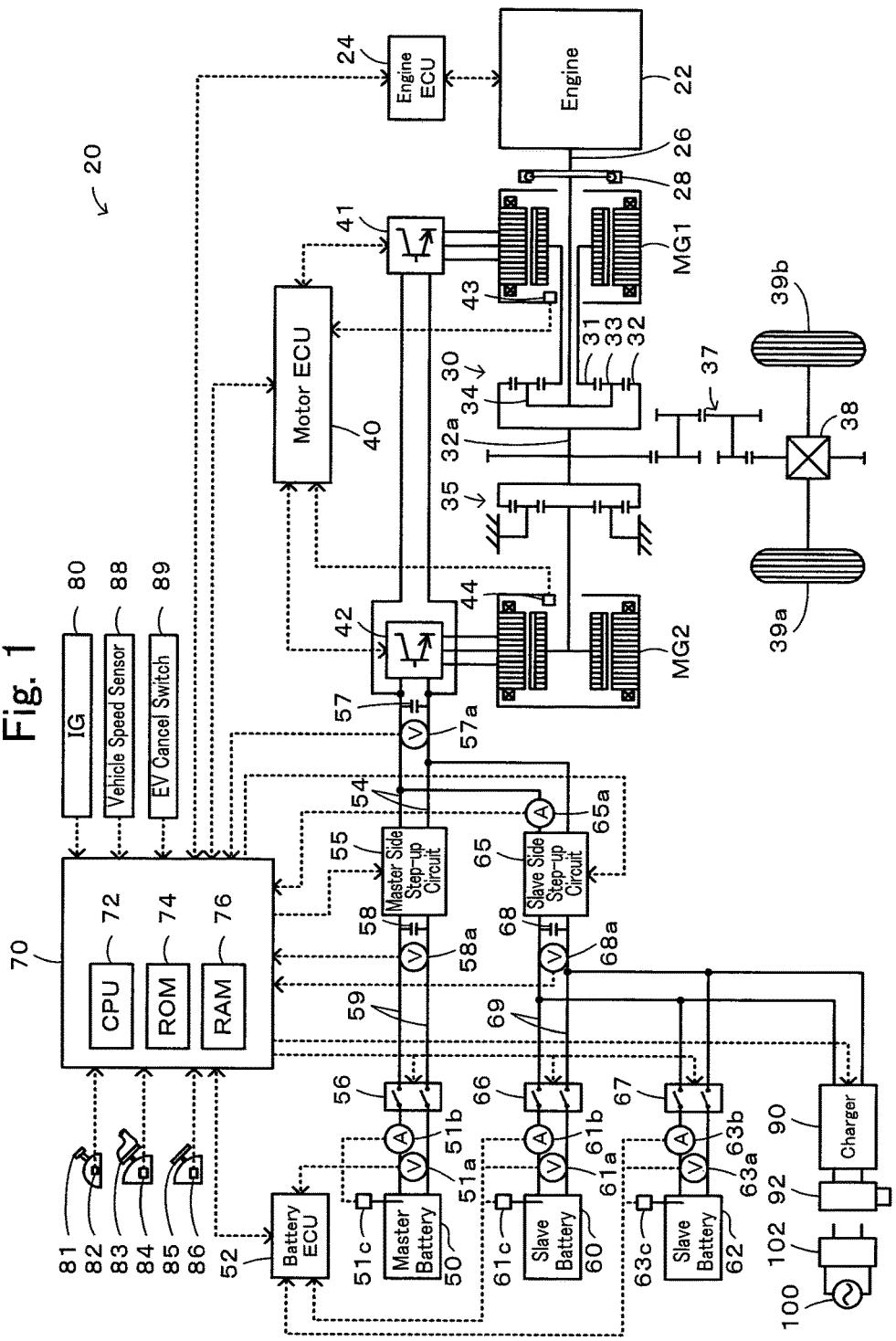
FIG. 1 schematically illustrates the configuration of a hybrid vehicle 20 in one embodiment of the invention.

FIG. 1 schematically illustrates the configuration of a hybrid vehicle 20 in one embodiment according to the invention. As illustrated, the hybrid vehicle 20 of the embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a motor MG2 connected via a reduction gear 35 to a ring gear shaft 32a or a driveshaft linked with the power distribution integration mechanism 30, inverters 41 and 42 each for driving the motors MG1 and MG2, a master battery 50 capable of charge and discharge, a master side step-up circuit 55 supplying electric power with voltage step-up from the master battery 50 directly to the inverters 41 and 42, a system main relay 56 connecting and disconnecting the master battery 50 to and from the master side step-up circuit 55, slave batteries 60 and 62 capable of charge and discharge, a slave side step-up circuit 65 supplying electric power with voltage step-up from the slave batteries 60 and 62 to the inverters 41 and 42, system main relays 66 and 67 each connecting and disconnecting each of the slave batteries 60 and 62 to and from the slave side step-up circuit 65, and a hybrid electronic control unit 70 configured to control the operations of the whole hybrid vehicle 20. For convenience of explanation, the side of the inverters 41 and 42 from the master side step-up circuit 55 and the slave side step-up circuit 65 is described as a high-voltage system, the side of the master battery 50 from the master side step-up circuit 55 is described as a first low-voltage system, and the side of the slave batteries 60 and 62 from the slave side step-up circuit 65 is described as a second low-voltage system hereafter.

The engine 22 is constructed as an internal combustion engine designed to consume a hydrocarbon fuel, such as gasoline or light oil, and thereby generate power. The engine 22 is under operation controls, such as fuel injection control, ignition control, and intake air flow control, of an engine electronic control unit (hereafter referred to as engine ECU) 24 that inputs diverse signals from various sensors, for example, a crank position from a non-illustrated crank positions sensor to detect the crank angle of the crankshaft 26, used to measure and detect the operating conditions of the engine 22. The engine ECU 24 establishes communication with the hybrid electronic control unit 70 to drive and control the engine 22 in response to control signals from the hybrid electronic control unit 70 and with reference to the diverse signals from the various sensors and to output data regarding the operating conditions of the engine 22 to the hybrid electronic control unit according to the requirements. The engine ECU 24 also computes a rotation speed of the crankshaft 26, which is equivalent to a rotation speed Ne of the engine 22, based on the crank position from the crank positions sensor.

The power distribution integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via a gear mechanism 37 and a differential gear 38 frpm ring gear shaft 32a.

Both the motors MG1 and MG2 are known synchronous motor generators that are driven as a generator and as a motor. The motors MG1 and MG2 transmit electric power to and from the master battery 50 via the inverters 41 and 42 and the master side step-up circuit 55, and transmit electric power to and from the slave batteries 60 and 62 via the inverters 41 and 42 and the slave side step-up circuit 65. Power lines (hereafter referred to as high-voltage system power lines) 54 that connect the inverters 41 and 42 with the master side step-up circuit 55 and the slave side step-up circuit 65 are constructed as a positive electrode bus line and a negative electrode bus line shared by the inverters 41 and 42. This arrangement enables the electric power generated by one of the motors MG1 and MG2 to be consumed by the other motor. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

Both the master side step-up circuit 55 and the slave side step-up circuit 65 are known step-up/down circuit. The master side step-up circuit 55 is connected to power lines (hereafter referred to as first low-voltage system power lines) 59 that are connected via the system main relay 56 to the master battery 50, and the above described high-voltage system power line 54. The master side step-up circuit 55 steps up the voltage of electric power from the master battery 50 to supply the electric power to the inverters 41 and 42, and steps down the voltage of electric power applied to the inverters 41 and 42 to charge the master battery 50. The slave side step-up circuit 65 is connected to power lines (hereafter referred to as second low-voltage system power lines) 69 that are connected via the system main relay 66 to the slave battery 60 and via the system main relay 67 to the slave battery 62, and the high-voltage power lines 54. The slave side step-up circuit 65 steps up the voltage of electric power from a slave battery (hereafter referred to as connection side slave battery) which is connected to the slave side step-up circuit 65 between the slave batteries 60 and 62 to supply the electric power to the inverters 41 and 42, and steps down the voltage of electric power applied to the inverters 41 and 42 to charge the connection side slave battery. A smoothing capacitor 57 is connected to the positive electrode bus line and negative electrode bus line of the high-voltage system power lines 54, a smoothing capacitor 58 is connected to the positive electrode bus line and negative electrode bus line of the first low-voltage system power lines 59, and a smoothing capacitor 68 is connected to the positive electrode bus line and negative electrode bus line of the second low-voltage system power lines 69.

All of the master battery 50 and the slave batteries 60 and 62 are constructed as lithium-ion secondary batteries, and are under control of a battery electronic control unit (hereafter referred to as battery ECU) 52. The battery ECU 52 receives diverse signals required for control of the master battery 50 and the slave batteries 60 and 62, for example, an inter-terminal voltage Vb1 measured by a voltage sensor 51a disposed between terminals of the master battery 50, a charge-discharge current Ib1 measured by a current sensor 51b attached to an output terminal at the positive pole side of the master battery 50, a battery temperature Tb1 measured by a temperature sensor 51c attached to the master battery 50, inter-terminal voltages Vb2 and Vb3 measured by voltage sensors 61a and 63a disposed respectively between terminals of the slave batteries 60 and 62, charge-discharge currents Ib2 and Ib3 measured by current sensors 61b and 63b attached respectively to output terminals at the positive pole side of the slave batteries 60 and 62, and a battery temperature Tb2 and Tb3 measured by temperature sensors 61c and 63c attached respectively to the slave batteries 60 and 62. The battery ECU 52 outputs data relating to each state of the master battery 50 and the slave batteries 60 and 62 to the hybrid electronic control unit 70 via communication according to the requirements. The battery ECU 52 performs various arithmetic operations for management and control of the master battery 50. An accumulated charge amount SOC1 of the master battery 50 is calculated from an integrated value of the charge-discharge current Ib1 measured by the current sensor 51b. An input limit Win1 as an allowable charging electric power to be charged in the master battery 50 and an output limit Wout1 as an allowable discharging electric power to be discharged from the master battery 50 are set corresponding to the calculated accumulated charge amount SOC1 and the battery temperature Tb1. The battery ECU 52 performs various arithmetic operations for management and control of the slave batteries 60 and 62. Accumulated charge amounts SOC2 and SOC3 of the slave batteries 60 and 62 are calculated from integrated values of the charge-discharge currents Ib2 and Ib3 measured by the current sensors 61b and 63b. Input limits Win2 and Win3 as allowable charging electric powers to be charged in the slave batteries 60 and 62 and output limits Wout2 and Wout3 as allowable discharging electric powers to be discharged from the slave batteries 60 and 62 are set corresponding to the calculated accumulated charge amount SOC2 and SOC3 and the battery temperature Tb2 and Tb3. The battery ECU 52 also performs arithmetic operations for calculating an accumulated charge ratio SOC that is a ratio of the sum of the calculated accumulated charge amount SOC1, SOC2, and SOC3 to the total capacity of the master battery 50 and the slave batteries 60 and 62. A concrete procedure of setting the input and output limits Win1 and Wout1 of the master battery 50 sets base values of the input limit Win1 and the output limit Wout1 corresponding to the battery temperature Tb1, specifies an input limit correction factor and an output limit correction factor corresponding to the accumulated charge amount SOC1 of the master battery 50, and multiplies the base values of the input limit Win1 and the output limit Wout1 by the specified input limit correction factor and output limit correction factor to determine the input limit Win1 and the output limit Wout1 of the master battery 50.

A charger 90 is connected to the second low-voltage system in parallel with the slave batteries 60 and 62 against the slave side step-up circuit 65, and a vehicle side connector 92 is connected to the charger 90. The vehicle side connector 92 is constructed capable of connecting an external power supply side connector 102 connected to an external power supply of AC (for example, domestic power supply (AC 120V)) 100 that is a power supply at the outside of the vehicle. The charger 90 includes a charging relay that makes connection and disconnection between the second low-voltage system and the vehicle side connector 92, an AC-to-DC converter that converts AC power from the external power supply 100 to DC power, and a DC-to-DC converter that regulates the voltage of the DC power converted by the AC-to-DC converter to supply the power to the second low-voltage system.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: a voltage (voltage of the high-voltage system) VH measured by a voltage sensor 57*a* disposed between terminals of the smoothing capacitor 57, a voltage (voltage of the first low-voltage system) VL1 measured by a voltage sensor 58*a* disposed between terminals of the smoothing capacitor 58, a voltage (voltage of the second low-voltage system) VL2 measured by a voltage sensor 68*a* disposed between terminals of the smoothing capacitor 68, an ignition signal from an ignition switch 80, a slave side current Ibs measured by a current sensor 65*a* attached to a terminal at the side of the high-voltage system power lines 54 of the slave side step-up circuit 65, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, a vehicle speed V from a vehicle speed sensor 88, and an EV cancel SW signal EVCN from a motor travel priority mode cancellation switch (hereafter referred to as 'EV cancel SW') 89 to cancel a motor travel priority mode and set a hybrid travel priority mode. The hybrid electronic control unit 70 outputs various signals via the output port: switching control signals to switching elements of the master side step-up circuit 55, switching control signals to switching elements of the slave side step-up circuit 65, driving signals to the system main relays 56, 66 and 67, control signals to the charger 90. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32*a* functioning as the drive shaft, based on observed values of a vehicle speed V and an accelerator opening Acc, which corresponds to a driver's step-on amount of the accelerator pedal 83. The engine 22 and the motors MG1 and MG2 are subjected to operation control to output a required level of power corresponding to the calculated torque demand to the ring gear shaft 32*a*. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32*a*. The charge-discharge drive mode controls the operations of the engine 22 to output a quantity of power equivalent to the sum of the required level of power and a quantity of electric power consumed by charging any of the master battery 50 and the slave batteries 60 and 62 or supplied by discharging any of the master battery 50 and the slave batteries 60 and 62, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32*a*, simultaneously with charge or discharge of any of the master battery 50 and the slave batteries 60 and 62. The motor drive mode stops the operations of the engine 22 and drives and controls the motor MG2 to output a quantity of power equivalent to the required level of power to the ring gear shaft 32*a*. For convenience of explanation, vehicle travelling only with input and output power to and from the motor MG2 is described as motor travel, and vehicle travelling with output power from the engine 22 and with the input and output power to and from the motor MG2 is described as hybrid travel hereafter.

In the hybrid vehicle 20 of the embodiment, upon connection between the external power supply side connector 102 and the vehicle side connector 92 after system shutdown of the vehicle at home or at a predetermined charging point, the charging relay in the charger 90 is switched to ON. The master battery 50 and the slave batteries 60 and 62 are then brought to each fully charged state or a preset charge state that is a less charged state than the fully charged state (for example, each state of the accumulated charge amounts SOC1, SOC2, and SOC3 equal to 80% or 85%), by switching ON/OFF the system main relays 56, 66 and 67 and controlling the master side step-up circuit 55, the slave side step-up circuit 65, and the AC-to-DC converter and DC-to-DC converter in the charger 90. When the vehicle system is started up (by ignition on) at the state of the master battery 50 and the slave batteries 60 and 62 being charged enough as described and vehicle travelling is started, it is enabled to drive the hybrid vehicle 20 for some extent of distance (time) with the motor travel using electric power from the master battery 50 and the slave batteries 60 and 62. In the hybrid vehicle 20 of the embodiment, the slave batteries 60 and 62 are included in addition to the master battery 50, and it is thus enabled to have a longer travelling distance (travelling time) for driving the hybrid vehicle 20 with the motor travel in comparison with a vehicle only including the master battery 50. In the cases that the duration of the system shutdown state is relatively short and that the electric charge of the charger 90 is not performed during the system shutdown state, a charge record of the charger 90 and a travel mode is set. The travel mode represents whether the motor travel is performed or not according to the accumulated charge ratio SOC.

Figure 2:
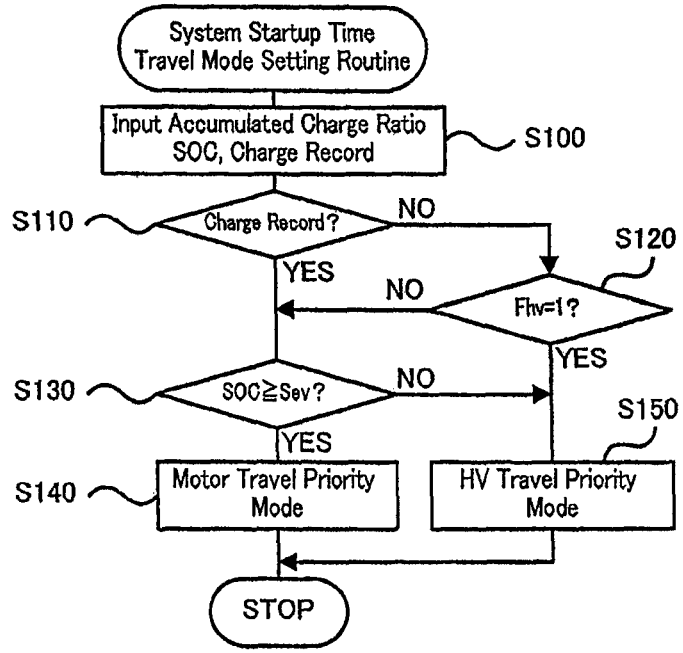
FIG. 2 is a flowchart showing a system startup time travel mode setting routine executed by a hybrid electronic control unit 70 in the embodiment.

FIG. 2 is a flowchart showing a system startup time travel mode setting routine executed by the hybrid electronic control unit 70 in the embodiment. In this routine executed when the vehicle system is started up, the CPU 72 of the hybrid electronic control unit 70 inputs the accumulated charge ratio SOC and the charge record of the charger 90 (step S100). The accumulated charge ratio SOC is calculated as a ratio of the sum of the accumulated charge amount SOC1, SOC2, and SOC3 of the master battery 50 and the slave batteries 60 and 62 to the total capacity of the master battery 50 and the slave batteries 60 and 62, and is input from the battery ECU 52 by communication. The charge record is input by reading a signal that is stored in a preset area of the RAM 76 and represents whether any of the master battery 50 and the slave batteries 60 and 62 are charged by the charger 90 in the system shutdown state.

The CPU 72 next determines whether there is the charge record of the charger 90 (step S110). When there is the charge record, the accumulated charge ratio SOC is compared to a threshold value Sev (for example, 40% or 50%) that is predetermined as an accumulated charge ratio SOC allowing some extent of the motor travel. When the accumulated charge ratio SOC is more than or equal to the threshold value Sev, a motor travel priority mode is set, where the hybrid vehicle 20 is driven with a higher priority given to the vehicle travelling in the motor drive mode (the motor travel), is set as the travel mode (step S140). This routine is then terminated. When the accumulated charge ratio SOC is less than the threshold value Sev, a hybrid travel priority mode, where the hybrid vehicle 20 is driven with a higher priority given to the vehicle travelling in the engine drive mode (the hybrid travel), is set as the travel mode (step S150). This routine then is terminated.

Upon determination that there is no charge record of the charger 90 at the processing of step S110, the CPU 72 checks a hybrid travel shift flag Fhv (step S120). The hybrid travel shift flag Fhv is set to value '1' when the hybrid travel priority mode is set as the travel mode for the reason that the accumulated charge ratio SOC reaches a threshold value Shv (for example, 20% or 30%) that is predetermined to enable starting up the engine 22 adequately. When the hybrid travel shift flag Fhv is equal to value '0', it is decided that the electric charge of the charger 90 has not been performed but the accumulated charge ratio SOC may be relatively large. Then, in the same way as the case that there is the charge record of the charger 90, the motor travel priority mode is set as the travel mode when the accumulated charge ratio SOC is more than or equal to the threshold value Sev (step S140), and the hybrid travel priority mode is set as the travel mode when the accumulated charge ratio SOC is less than the threshold value Sev (step S150). This routine is then terminated. Accordingly, the motor travel priority mode is set, in ordinary cases, as the travel mode at the system startup without the electric charge of the charger 90 after the system shutdown in the state that the motor travel priority mode is set as the travel mode. When the hybrid travel shift flag Fhv is equal to value '1' on the other hand, it is decided that the accumulated charge ratio SOC is mere the extent of the threshold value Shv and the hybrid travel priority mode is set as the travel mode (step S150). This routine is then terminated. The hybrid travel shift flag Fhv is set in the post-startup time travel mode setting routine of FIG. 3 described later, and is set to value '0' as an initial value when the electric charge of charger 90 is performed.

Figure 3:
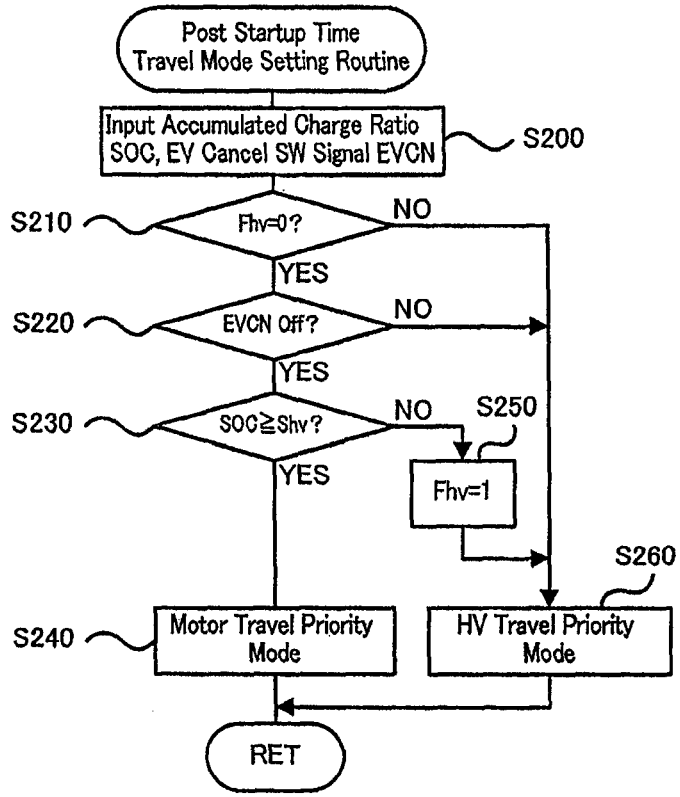
FIG. 3 is a flowchart showing a post-startup time travel mode setting routine executed by the hybrid electronic control unit 70 in the embodiment.

Upon the vehicle travelling start with the setting of the travel mode at the system startup time, the travel mode is set based on the accumulated charge ratio SOC and the EV cancel SW signal EVCN from the EV cancel SW 89 after that. FIG. 3 is a flowchart showing a post-startup time travel mode setting routine executed by the hybrid electronic control unit 70 in the embodiment. This routine is executed repeatedly at preset time intervals (for example, at every 10 milliseconds) after the travel mode is set in the system startup time travel mode setting routine. In the post-startup time travel mode setting routine, the CPU 72 of the hybrid electronic control unit 70 inputs various data required for setting the travel mode, for example, the accumulated charge ratio SOC and the EV cancel SW signal EVCN from the EV cancel SW 89 (step S200), and the CPU 72 checks the value of the hybrid travel shift flag Fhv and the EV cancel SW signal EVCN (step S210, S220).

When the vehicle system is started up after the electric charge of the charger 90 is performed in the system shutdown state, the motor travel priority mode is set in ordinary cases as described above, while the hybrid travel shift flag Fhv is set to value '0' as the initial value. If the EV cancel SW 89 is not switched on, the CPU 72 determines that the hybrid travel shift flag Fhv is equal to value '0' and the EV cancel SW signal EVCN is off, and the CPU 72 then determines whether the accumulated charge ratio SOC is more than or equal to the threshold value Shv that is predetermined to enable starting up the engine 22 adequately (step S230). When the accumulated charge ratio SOC is more than or equal to the threshold value Shv, the motor travel priority mode is continuously set as the travel mode (step S240), and this routine is terminated.

When the accumulated charge ratio SOC is determined to be less than the threshold value Shv at the processing of step S230 in the case that the accumulated charge ratio SOC becomes less than the threshold value Shv due to the vehicle travelling in the motor travel priority mode, the CPU 72 sets the hybrid travel shift flag Fhv to value '1' (step S250) and sets the hybrid travel priority mode as the travel mode (step S260). This routine is then terminated. After these settings of the hybrid travel shift flag Fhv to value '1' and the hybrid travel priority mode, the hybrid travel shift flag Fhv is determined to be equal to value '1' at the processing of step S210 in the next execution of this routine. The hybrid travel priority mode is continuously set as the travel mode (step S260).

When the driver switches the EV cancel SW 89 on during the vehicle travelling in the motor travel priority mode, the EV cancel SW signal EVCN is determined to be on at the processing of step S220 and the hybrid travel priority mode is set as the travel mode (step S260). This routine is then terminated. While the EV cancel SW 89 is continuously on even in the following execution of this routine, the EV cancel SW signal EVCN is determined to be on at the processing of step S220 and the hybrid travel priority mode is set as the travel mode (step S260). This routine is then terminated.

When the driver switches the EV cancel SW 89 off while the vehicle is travelling in the hybrid travel priority mode, the EV cancel SW signal EVCN is determined to be off at the processing of step S220. Then, in the same way as the case that the motor travel priority mode is set after the system startup, the motor travel priority mode is set as the travel mode when the accumulated charge ratio SOC is more than or equal to the threshold value Shy, while setting the hybrid travel shift flag Fhv to value '1' and the hybrid travel priority mode as the travel mode (step S230 through S260).

Figure 4:
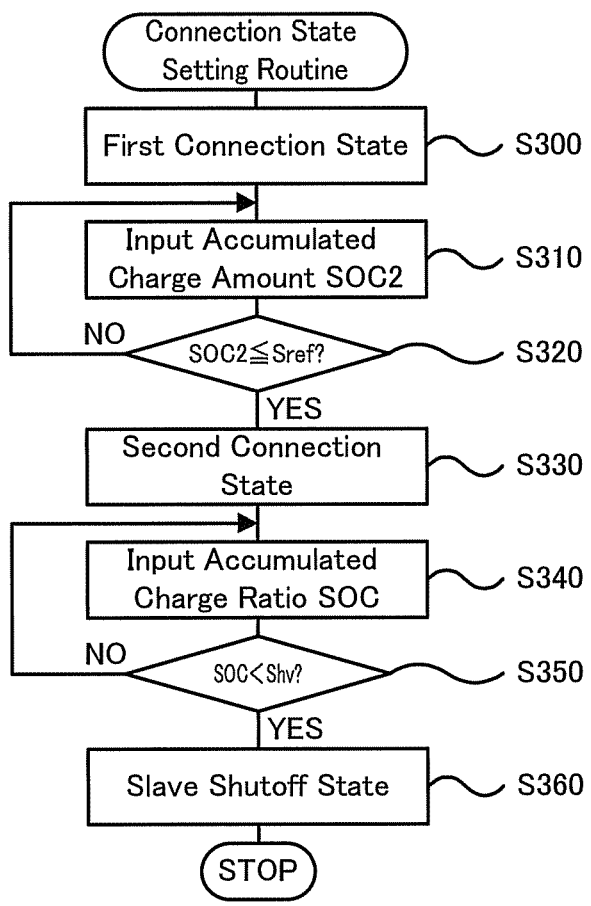
FIG. 4 is a flowchart showing a connection state setting routine executed by the hybrid electronic control unit 70 in the embodiment.

In the hybrid vehicle 20 of the embodiment, in the case that the hybrid vehicle 20 is driven in the motor travel priority mode, each connection state of the master battery 50 and the slave batteries 60 and 62 is switched by a connection state setting routine shown as one example in FIG. 4. This routine is executed by the hybrid electronic control unit 70. In the connection state setting routine, when the vehicle system is started up (by ignition on) at the state of the master battery 50 and the slave batteries 60 and 62 being charged enough, the CPU 72 of the hybrid electronic control unit 70 switches the system main relays 56 and 66 to ON and leads to a first connection state (where the master battery 50 and the master side step-up circuit 55 are connected and the slave battery 60 and the slave side step-up circuit 65 are connected) (step S300). The hybrid vehicle 20 is driven in the motor travel priority mode by a step-up circuit control described later in which the master side step-up circuit 55 and the slave side step-up circuit 65 are controlled so that the accumulated charge amount SOC2 of the slave battery 60 decreases faster than the accumulated charge amount SOC1 of the master battery 50. When the accumulated charge amount SOC2 of the slave battery 60 becomes less than or equal to a threshold value Sref (steps S310 and S320), the CPU 72 switches the system main relay 66 to OFF and the system main relay 67 to ON to change from the first connection state to a second connection state (where the slave battery 60 and the slave side step-up circuit 65 are disconnected and the slave battery 62 and the slave side step-up circuit 65 are connected) (step S330). The threshold value Sref is set as an accumulated charge amount which is the accumulated charge amount SOC2 of the slave battery 60 converted to an accumulated charge ratio equivalent to the threshold value Shv. When the accumulated charge ratio SOC becomes less than or equal to the threshold value Shv with vehicle travelling in the motor travel priority mode under control of the master side step-up circuit 55 and the slave side step-up circuit 65 (steps S340 and S350), the CPU 72 switches the system main relay 67 to OFF to change from the second connection state to a slave shutoff state (where the slave battery 62 and the slave side step-up circuit 65 are disconnected) (step S360). The CPU 72 then terminates this routine. In the slave shutoff state, the hybrid vehicle 20 is driven with intermittent operations of the engine 22 based on a power demand required for the vehicle (power demand Pe* described later). In the hybrid vehicle 20 of the embodiment, when the vehicle system is started up at the state of the master battery and the slave batteries 60 and 62 being not charged with electric power from the external power supply 100, the vehicle travelling is started at any of the first connection state, the second connection state, or the slave shutoff state according to the accumulated charge amounts SOC1, SOC2 and SOC3 of the master battery 50 and the slave batteries 60 and 62.

Figure 5:
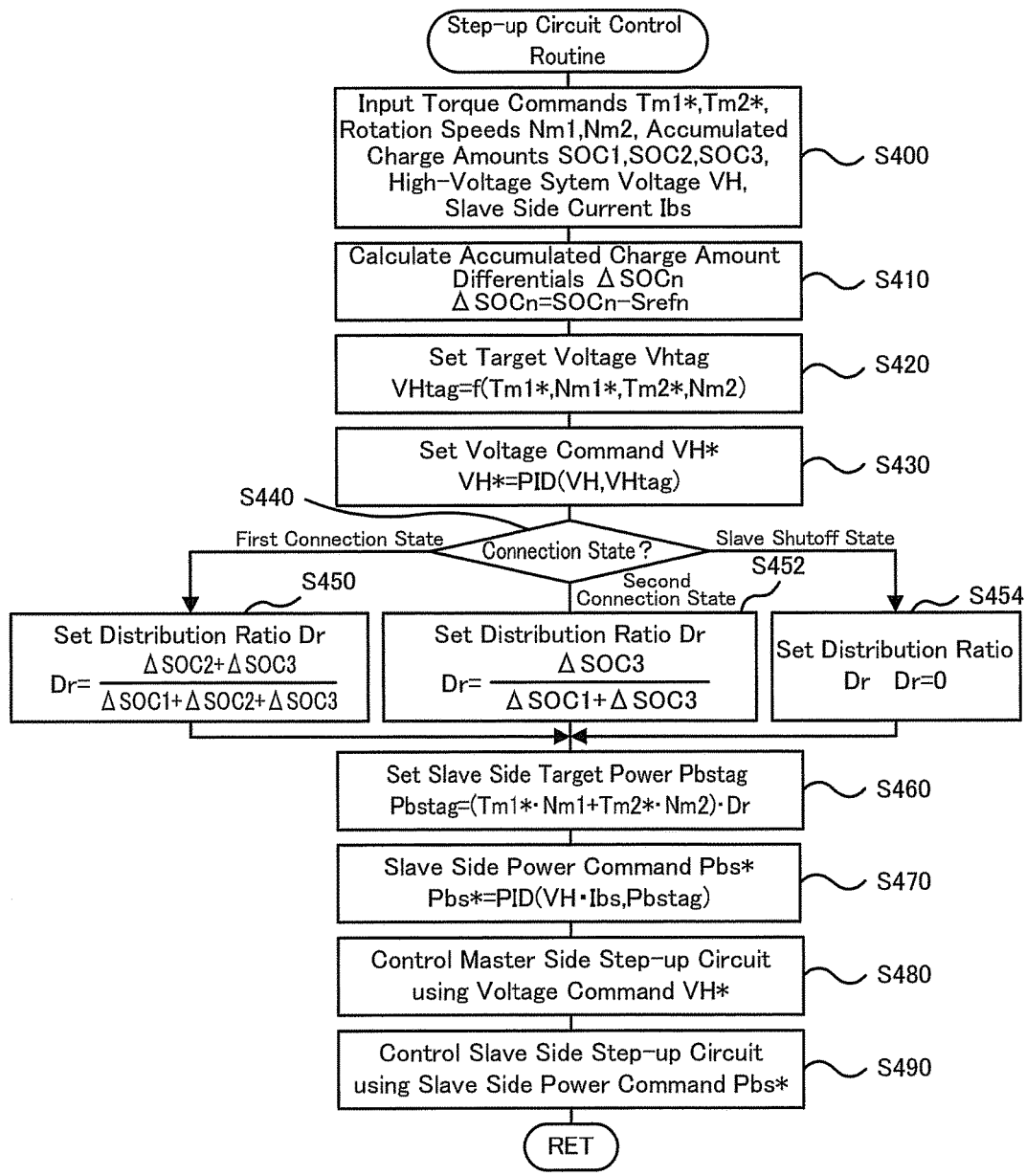
FIG. 5 is a flowchart showing a step-up circuit control routine executed by the hybrid electronic control unit 70 in the embodiment.

In the hybrid vehicle 20 of the embodiment, the master side step-up circuit 55 and the slave side step-up circuit 65 are controlled by a step-up circuit control routine shown as one example in FIG. 5. This routine is executed repeatedly at preset time intervals (for example, at every several milliseconds). In the step-up circuit control routine, the CPU 72 of the hybrid electronic control unit 70 inputs various data required for control, for example, torque commands Tm1* and Tm2* of the motors MG1 and MG2, the rotation speeds Nm1* and Nm2* of the motors MG1 and MG2, the accumulated charge amount SOC1 of the maser battery 50, the accumulated charge amounts SOC1 and SOC2 of the slave batteries 60 and 62, the voltage VH of the high-voltage system from the voltage sensor 57a, and the slave side current Ibs from the current sensor 65a (step S400). The CPU 72 calculates accumulated charge amount differentials ΔSOC1, ΔSOC2 and ΔSOC3 from subtracting preset accumulated charge amounts Sref1, Sref2 and Sref3 respectively from the accumulated charge amount SOC1 of the master battery 50 and the accumulated charge amounts SOC2 and SOC3 of the slave batteries 60 and 62 (step S410). The torque commands Tm1* and Tm2* of the motor MG1 and MG2 are set in a drive control routine described later and are input. The rotation speeds Nm1 and Nm2 of the motors MG1 and MG2 are computed from the rotational positions of the rotors in the motors MG1 and MG2 detected by the rotational position detection sensors 43 and 44 and are input from the motor ECU 40 by communication. The accumulated charge amount SOC1 of the master battery 50 and the accumulated charge amounts SOC2 and SOC3 of the slave batteries 60 and 62 are computed from the integrated values of the charge-discharge currents Ib1, Ib2 and Ib3 measured by the current sensors 51b, 61b and 63b and are input from the battery ECU 52 by communication. The preset accumulated charge amounts Sref1, Sref2 and Sref3 are set as accumulated charge amounts which are the accumulated charge amount SOC1 of the master battery 50 and the accumulated charge amounts SOC2 and SOC3 of the slave batteries 60 and 62 each converted to an accumulated charge ratio equivalent to the threshold value Shv.

The CPU 72 subsequently sets a target voltage VHtag of the high-voltage system power lines 54 based on the torque commands Tm1* and Tm2* and the rotation speeds Nm1 and Nm2 of the motors MG1 and MG2 (step S420), and sets a voltage command VH* used for control of the master step-up circuit 55 by voltage feedback control to bring the voltage VH of the high-voltage system to the target voltage VHtag (step S430). The target VHtag is set to the larger one between a voltage enabling to drive the motor MG1 at the target operation point (the torque command Tm1*, the rotation speed Nm1) of the motor MG1 and a voltage enabling to drive the motor MG2 at the target operation point (the torque command Tm2*, the rotation speed Nm2).

The CPU 72 next determines the connection state set in the connection state setting routine of FIG. 4 (step S440). At the first connection state, a distribution ratio Dr is calculated from the accumulated charge amount differentials ΔSOC1, ΔSOC2 and ΔSOC3 of the master battery 50 and the slave batteries 60 and 62, according to Equation (1) given below (step S450). The distribution ratio Dr is a ratio of electric power to be supplied to the side of the motor MG1 and MG2 from the slave battery 60 to the sum of electric power to be supplied to the side of the motor MG1 and MG2 from the master battery 50 and the electric power to be supplied to the side of the motor MG1 and MG2 from the slave battery 60. At the second connection state, the distribution ratio Dr is calculated from the accumulated charge amount differentials ΔSOC1 and ΔSOC3 of the master battery 50 and the slave batteries 62, according to Equation (2) given below (step S452). At the slave shutoff state, the distribution ratio Dr is set to value 0 (step S454). The reason for calculating the distribution ratio Dr in this way is to have a timing when the accumulated charge amount SOC1 becomes the preset accumulated charge amount Sref1 as the same timing as a timing when the accumulated charge amount SOC3 of the slave battery 62 becomes the preset accumulated charge amount Sref3, and to bring the accumulated charge ratio SOC to the threshold value Shv at that same timing.

$$Dr=(\Delta SOC2+\Delta SOC3)/(\Delta SOC1+\Delta SOC2+\Delta SOC3) \quad (1)$$

$$Dr=\Delta SOC3/(\Delta SOC1+\Delta SOC3) \quad (2)$$

The CPU 72 calculates a slave side target power Pbstag to be supplied to the side of the motors MG1 and MG2 from the side of the slave batteries 60 and 62, from multiplying the sum of power consumptions in the motors MG1 and MG2 by the distribution ratio Dr according to Equation (3) given below (step S460), and sets a slave side power command Pbs* by voltage feedback control to bring the electric power (VH·Ibs) supplied from the slave side to the slave side target power Pbstag (step S470). The CPU 72 controls the master side step-up circuit 55 so that the voltage VH of the high-voltage system power lines 54 becomes the target voltage VHtag using the voltage command VH* (step S480), and controls the slave side step-up circuit 65 so that the electric power supplied from the slave batteries 60 and 62 to the side of the motors MG1 and MG2 becomes the slave side electric power demand Pbs* (step S490). The step-up circuit control routine is then terminated. This control enables regulation of the voltage VH of the high-voltage system power lines 54, and regulations of the electric power supplied from the master battery 50 to the side of the inverters 41 and 42 and the electric power supplied from the connection side slave battery to the side of the inverters 41 and 42.

$$Pbstag=(Tm1^* \cdot Nm1+Tm2^* \cdot Nm2) \cdot Dr \quad (3)$$

Figure 6:
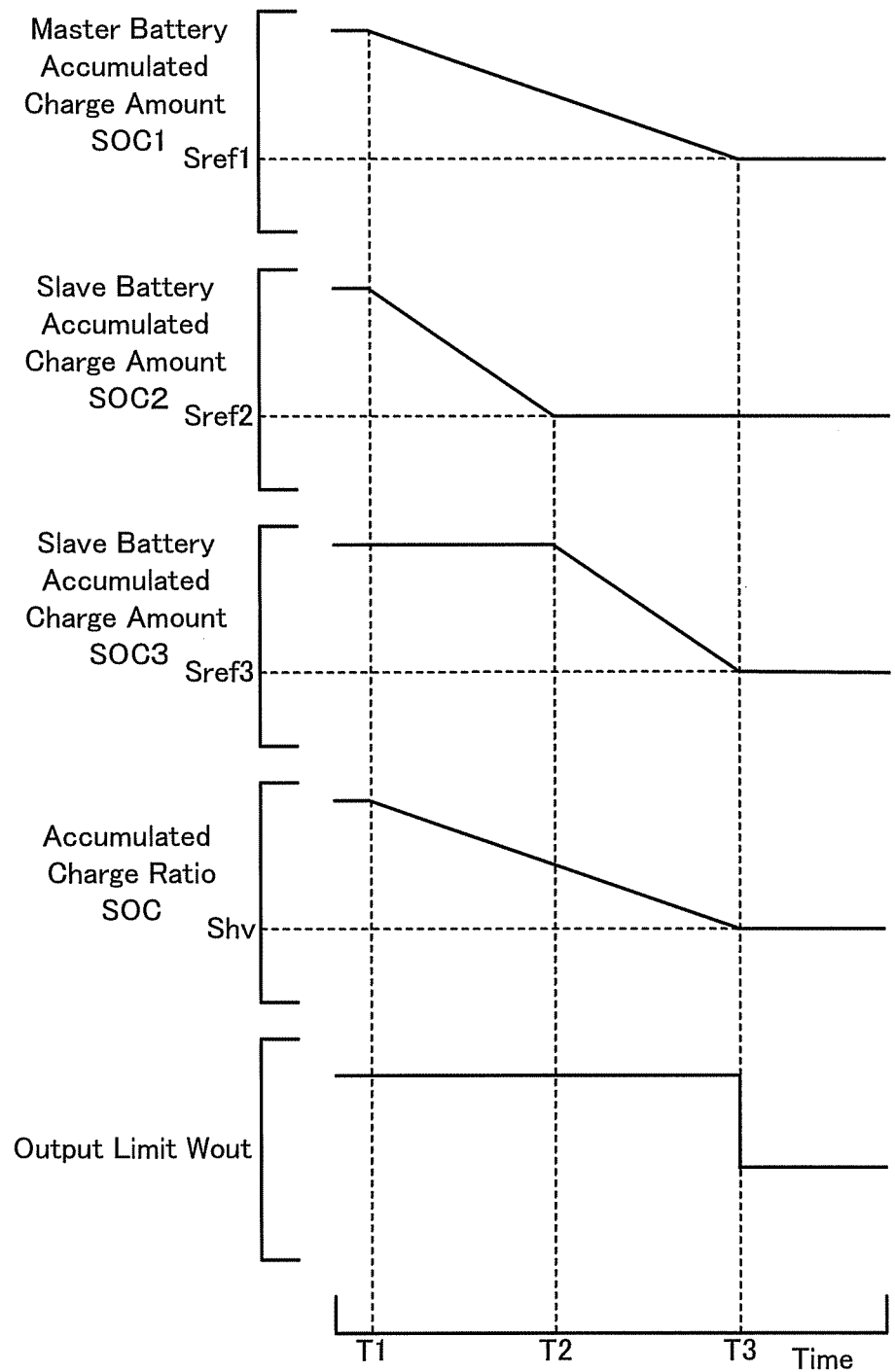
FIG. 6 shows one set of examples of time charts of an accumulated charge amount SOC1 of the master battery 50, an accumulated charge amounts SOC2 and SOC3 of slave batteries 60 and 62, an accumulated charge ratio SOC, and the output limit Wout in the case the hybrid vehicle 20 is driven equally to perform the motor travel in the motor travel priority mode.

FIG. 6 shows one set of examples of time charts of the accumulated charge amount SOC1 of the master battery 50, the accumulated charge amounts SOC2 and SOC3 of the slave batteries 60 and 62, the accumulated charge ratio SOC, and the output limit Wout in the case the hybrid vehicle 20 is driven equally to perform the motor travel in the motor travel priority mode. The output limit Wout is equivalent to the sum of the output limit Wout1 of the master battery 50 and the output limit of one connected slave battery, that is, equivalent to the sum of the output limit Wout1 of the master battery 50 and the output limit Wout2 of the slave battery 60 in the first connection state, equivalent to the sum of the output limit Wout1 of the master battery 50 and the output limit Wout3 of the slave battery 62 in the second connection state, and equivalent to the output limit Wout1 of the master battery 50 in the slave shutoff state. As shown in FIG. 6, the master battery 50 and the slave battery 60 are discharged in the first connection state from the time T1 of travelling start, and both the accumulated charge amount SOC1 of the master battery 50 and the accumulated charge amount SOC2 of the slave battery 60 are decreased. The electric power supplied from the slave battery 60 to the side of the motors MG1 and MG2 is in accordance with the distribution ratio Dr calculated as shown in Equation (1) and is larger than the electric power supplied from the master battery 50 to the side of the motors MG1 and MG2. The decrease in the accumulated charge amount SOC2 of the slave battery 60 is thus faster than the decrease in the accumulated charge amount SOC1 of the master battery 50. At the time T2 when the accumulated charge amount SOC2 of the slave battery 60 reaches the preset accumulated charge amount Sref2, the first connection state is changed to the second connection state. The master battery 50 and the slave battery 62 are discharged, and both the accumulated charge amount SOC1 of the master battery 50 and the accumulated charge amount SOC3 of the slave battery 62 are decreased. At this time, the electric power supplied from the slave battery 62 to the side of the motors MG1 and MG2 is in accordance with the distribution ratio Dr calculated as shown in Equation (2) and is larger than the electric power supplied from the master battery 50 to the side of the motors MG1 and MG2. The decrease in the accumulated charge amount SOC3 of the slave battery 62 is thus faster than the decrease in the accumulated charge amount SOC1 of the master battery 50. At the time T3 when the accumulated charge amount SOC1 of the master battery 50 reaches the preset accumulated charge amount Sref1 and the accumulated charge amount SOC3 of the slave battery 62 reaches the preset accumulated charge amount Sref3, the accumulated charge ratio SOC reaches the threshold value Shy leading to the slave shutoff state and the motor travel priority mode is changed to the hybrid travel priority mode.

Figure 7:
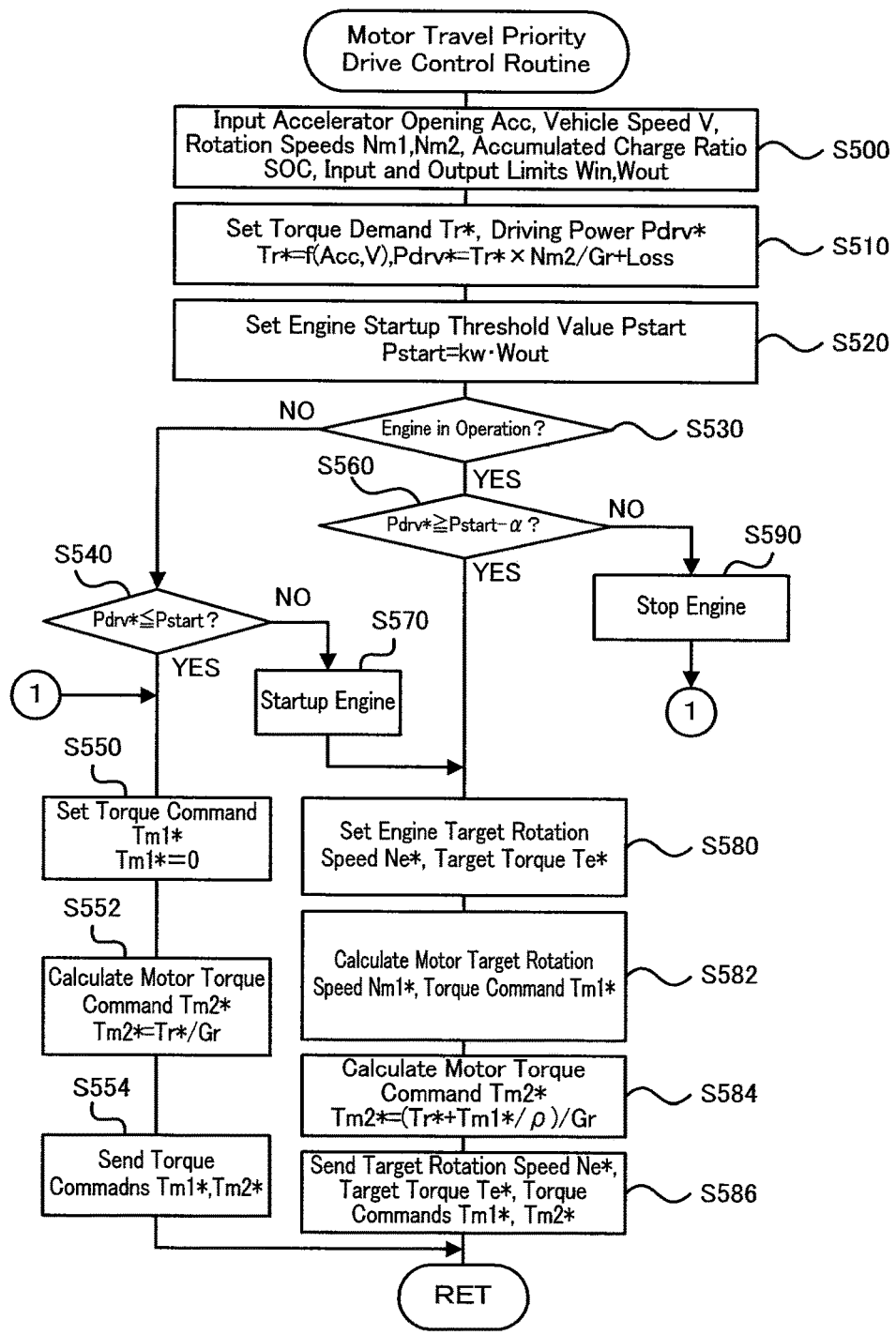
FIG. 7 is a flowchart showing a motor travel priority drive control routine executed by the hybrid electronic control unit 70 in the embodiment.
Figure 8:
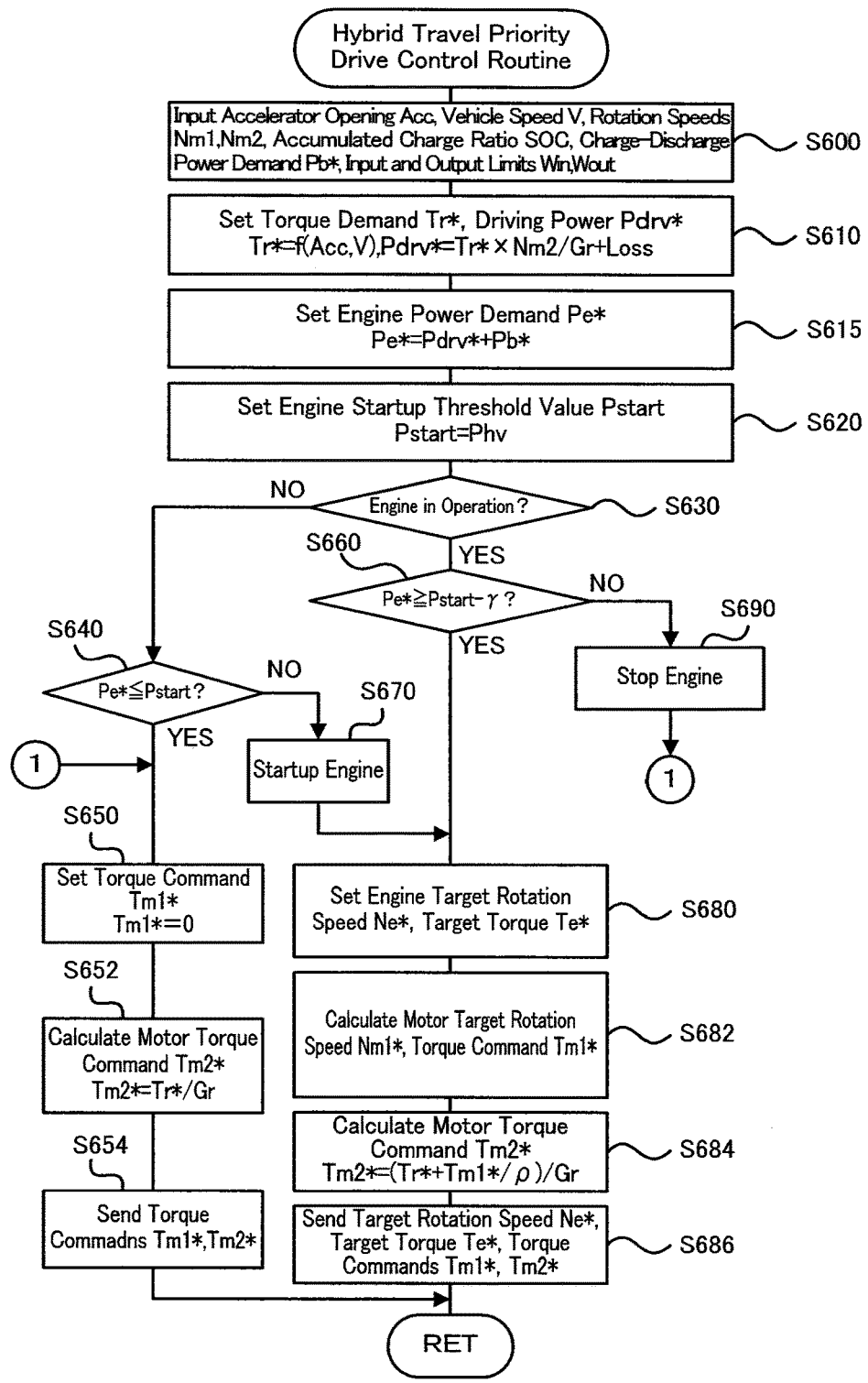
FIG. 8 is a flowchart showing a hybrid travel priority drive control routine executed by the hybrid electronic control unit 70 in the embodiment.

The description regards the drive control in the hybrid vehicle 20 of the embodiment. FIG. 7 is a flowchart showing a motor travel priority drive control routine executed by the hybrid electronic control unit 70 during the vehicle travelling in the motor travel priority mode. FIG. 8 is a flowchart showing a hybrid travel priority drive control routine executed by the hybrid electronic control unit 70 during the vehicle travelling in the hybrid travel priority mode. These are described below in turn.

Figure 9:
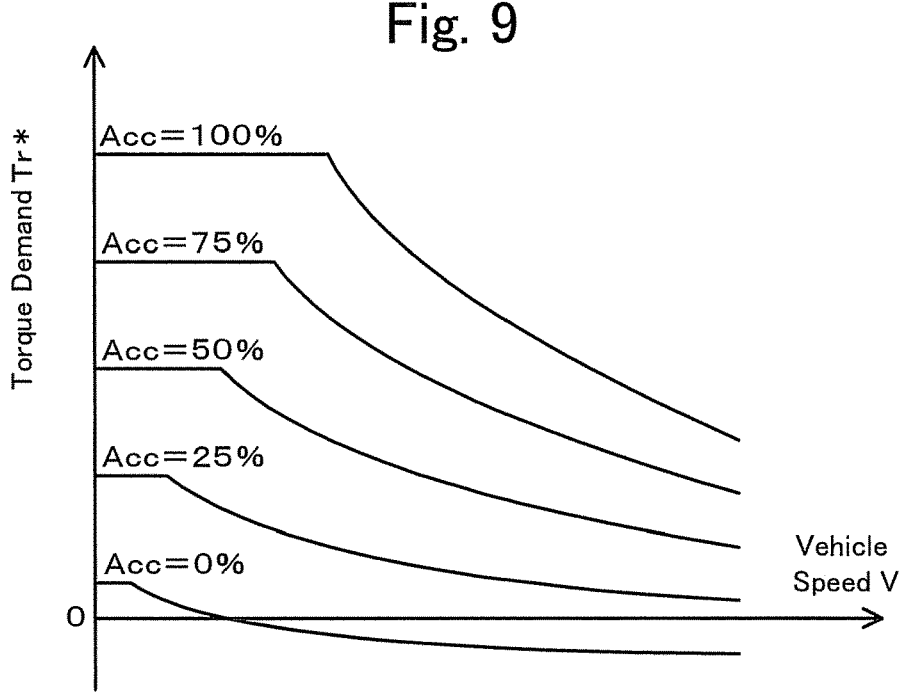
FIG. 9 shows one example of a torque demand setting map.

In the motor travel priority drive control routine of FIG. 7, the CPU 72 of the hybrid electronic control unit 70 inputs various data required for drive control, for example, the accelerator opening Acc from the accelerator pedal position sensor 84, the vehicle speed V from the vehicle speed sensor 88, the rotation speeds Nm1 and Nm2 of the motors MG1 and MG2, the accumulated charge ratio SOC, and the input and output limits Win and Wout (step S500). The CPU 72 sets a torque demand Tr* to be output to the ring gear shaft 32a or the driveshaft linked with the drive wheels 63a and 63b as a torque required for the hybrid vehicle 20 based on the input accelerator opening Acc and the input vehicle speed V, and a driving power Pdrv* required for driving the hybrid vehicle 20 (step S510). The CPU 72 obtains a value from multiplying the output limit Wout by a preset conversion factor kw for converting electric power to power for a driving system of the hybrid vehicle 20 and sets the value as a threshold value Pstart for starting up the engine 22 (step S520). The input limit Win is the sum of the input limit Win1 of the master battery 50 and the input limit of the connected slave battery, as with the output limit Wout. A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 9. The driving power Pdry is calculated as the sum of the product of the set torque demand Tr* and a rotation speed Nr of the ring gear shaft 32a, and a potential loss Loss. The rotation speed Nr of the ring gear shaft 32a is obtained by multiplying the vehicle speed V by a preset conversion factor k (Nr=k·V) or by dividing the rotation speed Nm2 of the motor MG2 by a gear ratio Gr of the reduction gear 35 (Nr=Nm2/Gr).

The CPU 72 subsequently determines whether the engine 22 is operated or the operation of the engine 22 is stopped (step S530). When the operation of the engine 22 is stopped, the CPU 72 determines whether the set driving power Pdrv* is less than or equal to the threshold value Pstart (step S540).

Figure 10:
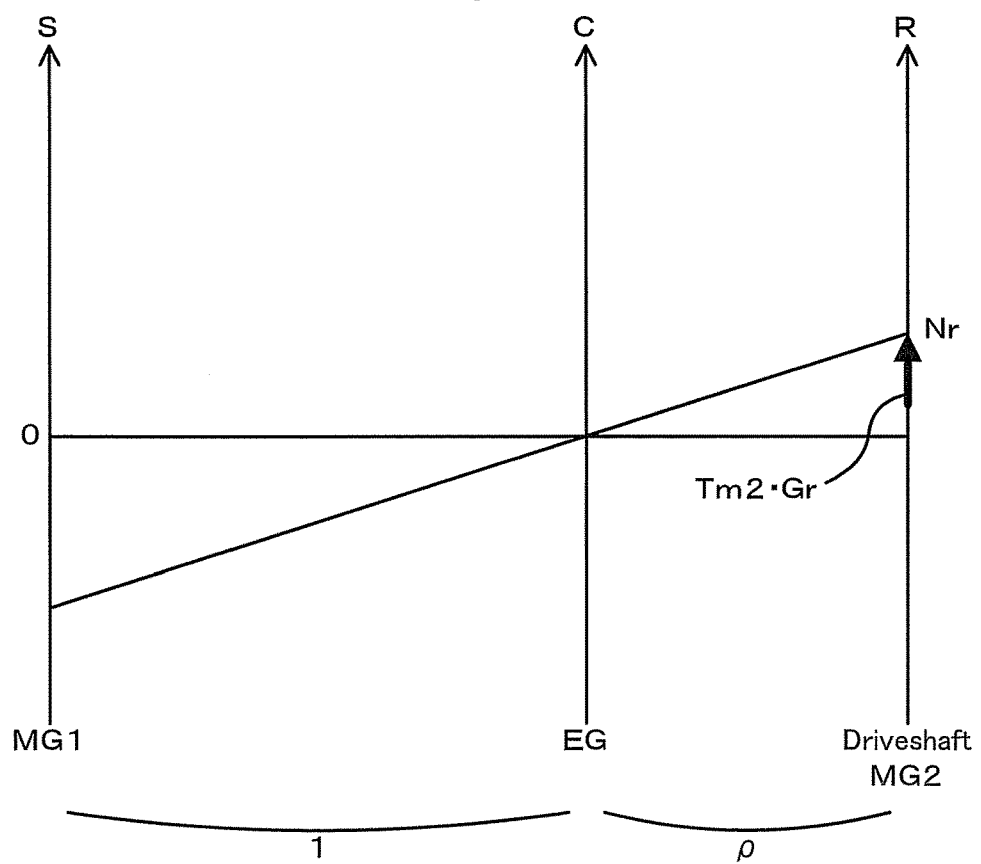
FIG. 10 is an alignment chart showing torque-rotation speed dynamics of respective rotational elements included in a power distribution integration mechanism 30 during motor travel with operation stop of an engine 22.

When the driving power Pdrv* is less than or equal to the threshold value Pstart, it is decided that the motor travel should be continued and the CPU 72 sets a torque command Tm1* of the motor MG1 to value '0' (step S550). The CPU 72 sets a torque command Tm2* of the motor MG2 by dividing the torque demand Tr* by the gear ratio Gr of the reduction gear 35 (step S552), and sends the settings of the torque commands Tm1* and Tm2* to the motor ECU 40 (step S554). This routine is then terminated. In response to reception of the settings of the torque commands Tm1* and Tm2*, the motor ECU 40 performs switching control of the non-illustrated switching elements in the inverter 41 and the non-illustrated switching elements in the inverter 42 to drive the motor MG1 with the torque commands Tm1* and the motor MG2 with the torque command Tm2*. This control enables the torque demand Tr* to be output from the motor MG2 to the ring gear shaft 32a or the drive shaft for driving the hybrid vehicle 20. FIG. 10 is an alignment chart showing torque-rotation speed dynamics of respective rotational elements included in the power distribution integration mechanism 30 during motor travel with operation stop of an engine 22. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35.

Upon determination that the driving power Pdrv* is more than the threshold value Pstart at the processing of step S540, the CPU 72 starts up the engine 22 (step S570). In a procedure for starting up the engine 22, the motor MG1 outputs some torque, the motor MG2 outputs torque for cancelling the torque output to the ring gear shaft 32a or the driveshaft according to the output torque from the motor MG1 to crank the engine 22, and various controls are started such as fuel injection control and ignition control when the rotation speed Ne of the engine 22 reaches a preset rotation speed (for example, 1000 rpm). During start-up of the engine 22, the drive control of the motor MG2 is performed as well to output the torque demand Tr* to the ring gear shaft 32a. The torque to be output from the motor MG2 thus becomes the sum of the torque to output the torque demand Tr* to the ring gear shaft 32a and the torque to cancel the applied torque to the ring gear shaft 32a by cranking the engine 22.

Figure 11:
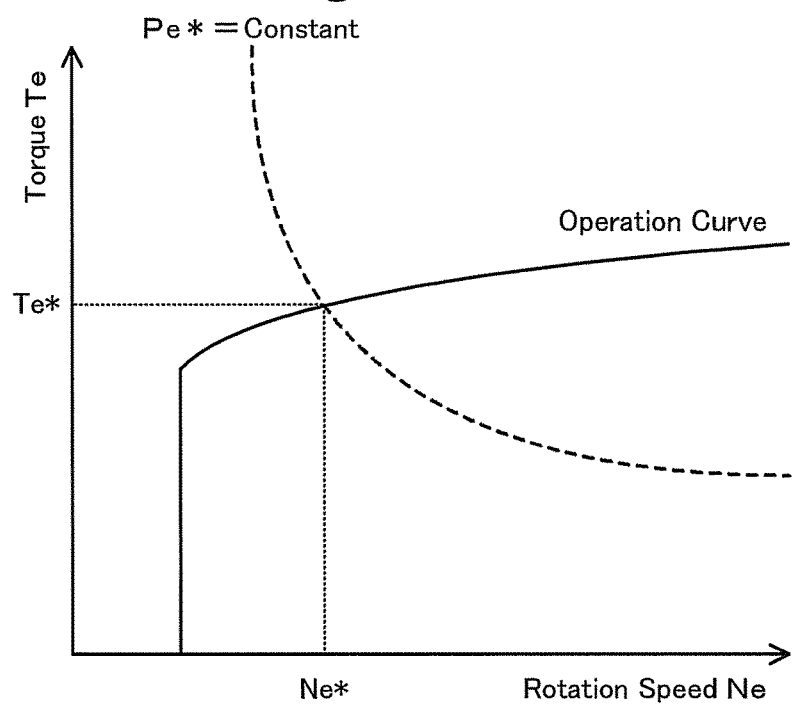
FIG. 11 shows an operation curve of the engine 22 used to set the target rotation speed Ne* and the target torque Te*.
Figure 12:
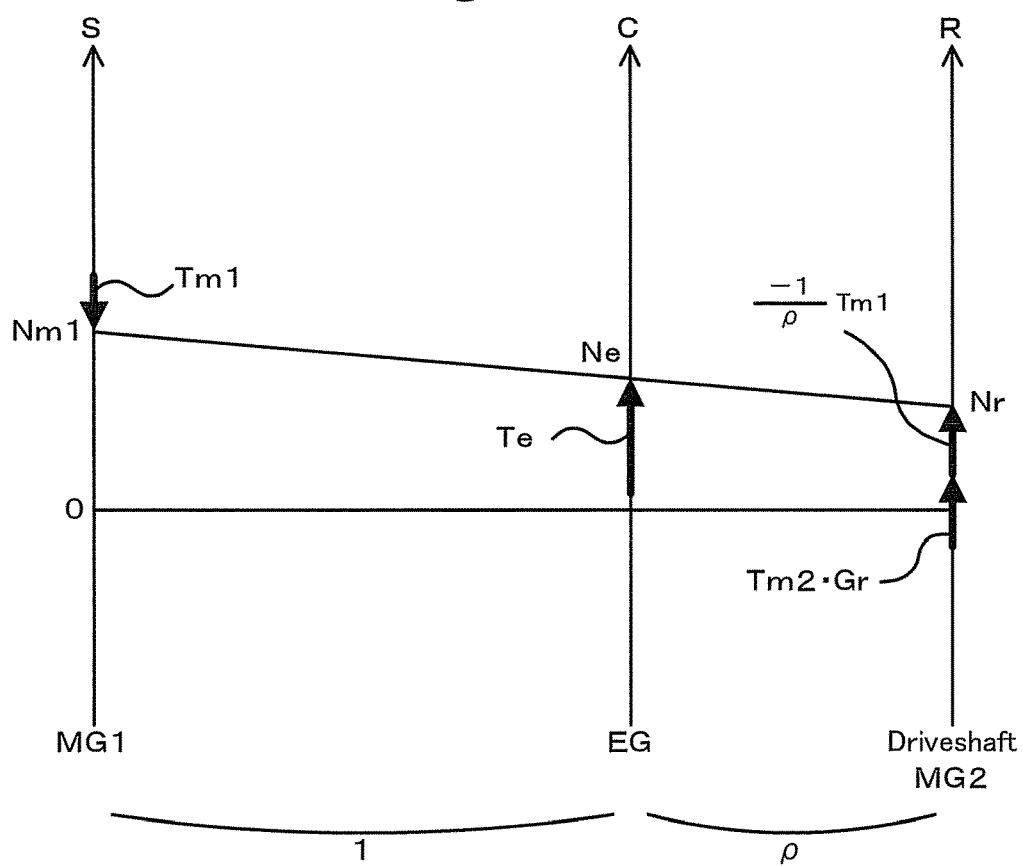
FIG. 12 is an alignment chart showing torque-rotation speed dynamics of the respective rotational elements included in the power distribution integration mechanism 30 during vehicle travelling with output power from the engine 22.

After starting up the engine 22, the CPU 72 sets the driving power Pdrv* to a power demand Pe* to be output from the engine 22 and sets a target rotation speed Ne* and a target torque Te* defining a target drive point of the engine 22 based on an operation curve of the engine 22 to ensure efficient operation of the engine 22 and the power demand Pe* (step S580). The CPU 72 calculates a target rotation speed Nm1* of the motor MG1 from the target rotation speed Ne* of the engine 22, the rotation speed Nm2 of the motor MG2, and a gear ratio ρ of the power distribution integration mechanism 30 according to Equation (4) given below, while calculating a torque command Tm1* of the motor MG1 from the calculated target rotation speed Nm1* and the current rotation speed Nm1 of the motor MG1 according to Equation (5) given below (step S582). FIG. 11 shows an operation curve of the engine 22 used to set the target rotation speed Ne* and the target torque Te*. As clearly shown in FIG. 11, the target rotation speed Ne* and the target torque Te* are given as an intersection of the operation curve and a curve of constant power demand Pe* (=Ne*×Te*). Equation (4) is a dynamic relational expression of respective rotational elements included in the power distribution integration mechanism 30. FIG. 12 is an alignment chart showing torque-rotation speed dynamics of the respective rotational elements included in the power distribution integration mechanism 30 during vehicle travelling with output power from the engine 22. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (4) is readily introduced from this alignment chart. Equation (5) is a relational expression of feedback control to drive and rotate the motor MG1 at the target rotation speed Nm1*. In Equation (5), 'k1' in the second term and 'k2' in the third term on the right side respectively denote a gain of the proportional and a gain of the integral term.

$$Nm1^* = Ne^* \cdot (1+\rho)/\rho - Nm2/\rho \tag{4}$$

$$Tm1^* = \rho \cdot Te^*/(1+\rho) + k1(Nm1^* - Nm1) + k2 \cdot (Nm1^* - Nm1)dt \tag{5}$$

The CPU 72 then calculates a torque command Tm2* of the motor MG2 by adding the torque command Tm1* of the motor MG1 divided by the gear ratio ρ of the power distribution integration mechanism 30 to the torque demand Tr* according to Equation (6) given below (step S584). The CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S586), and this routine is terminated. In response to reception of the settings of the target rotation speed Ne* and the target torque Te*, the engine ECU 24 performs required controls including intake air flow regulation, ignition control, and fuel injection control of the engine 22 to drive the engine 22 at the specific drive point defined by the combination of the target rotation speed Ne* and the target torque Te*. This control enables the driving power Pdrv* to be output efficiently from the engine 22 to output the torque demand Tr* to the ring gear shaft 32a or the driveshaft for driving the hybrid vehicle 20. Equation (6) is readily introduced from the alignment chart of FIG. 12.

$$Tm2^* = (Tr^* + Tm1^*/\rho)/Gr \tag{6}$$

When it is determined that the engine 22 is in operation at the processing of step S530, the CPU 72 compares the driving power Pdrv* with a value obtained by subtracting a preset power α as a margin from the threshold value Pstart (step S560). The preset power α is for having hysteresis to avoid frequent start and stop of the engine 22 while the driving power Pdrv* is near the threshold value Pstart and is predetermined to the extent appropriate. When the driving power Pdrv* is more than the value obtained by subtracting the preset power α from the threshold value Pstart, it is decided that the operation of the engine 22 should be continued. The CPU 72 sets the target rotation speed Ne* and the target rotation torque Te* of the engine 22 and the torque commands Tm1* and Tm2* of the motors MG1 and MG2 to output the torque demand Tr* to the ring gear shaft 32a or the driveshaft for driving the hybrid vehicle 20 while outputting the driving power Pdrv* efficiently from the engine 22, and sends the settings to the engine ECU 24 and the motor ECU 40 (step S580 through S586). This routine is then terminated. When the driving power Pdrv* is less than the value obtained by subtracting the preset power α from the threshold value Pstart, the operation of the engine 22 is stopped (step S590). The CPU 72 sets the torque command Tm1* of the motor MG1 to value '0' to perform the motor travel and sets the torque command Tm2* to the torque demand Tr* divided by the gear ratio Gr of the reduction gear 35 and sends the settings of the torque commands Tm1* and Tm2* to the motor ECU 40 (steps S550 through S554). This routine is then terminated.

Figure 13:
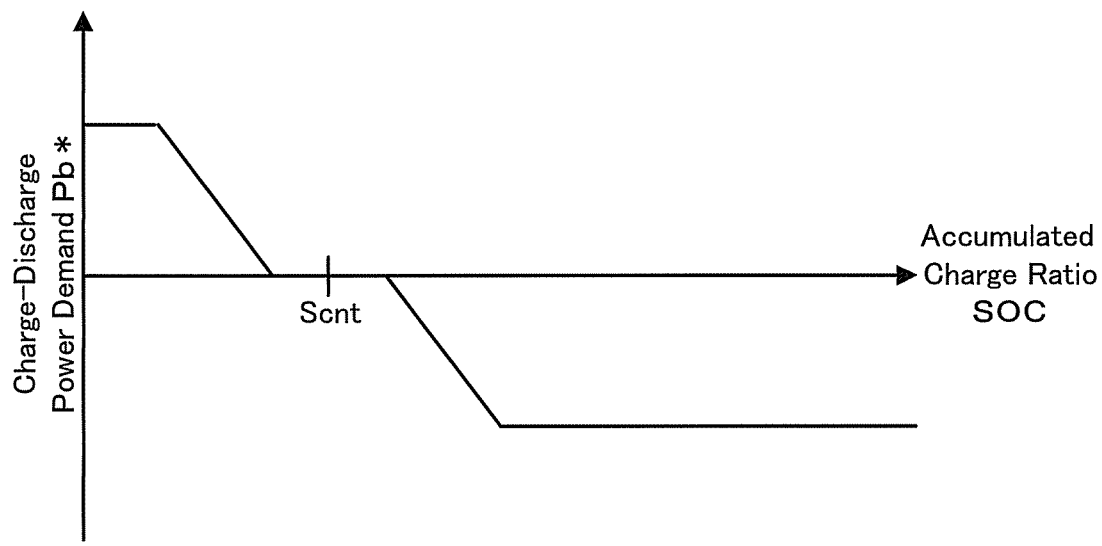
FIG. 13 shows one example of a charge-discharge power demand setting map.

The hybrid travel priority drive control routine of FIG. 8 is executed upon setting the hybrid travel priority mode as a travel mode. In this routine, the CPU 72 of the hybrid electronic control unit 70 inputs various data required for drive control, the accelerator opening Acc from the accelerator pedal position sensor 84, the vehicle speed V from the vehicle speed sensor 88, the rotation speeds Nm1 and Nm2 of the motors MG1 and MG2, the accumulated charge ratio SOC, the input and output limits Win and Wout, and a charge-discharge power demand Pb* (step S600). The CPU 72 sets the torque demand Tr* based on the accelerator opening Acc and the vehicle speed V using the torque demand setting map of FIG. 9 and sets the driving power Pdrv* as the sum of the product of the torque demand Tr* and the rotation speed Nr of the ring gear shaft 32a and the potential loss Loss (step S610). A concrete procedure of setting the charge-discharge power demand Pb* in this embodiment provides and stores in advance variations in charge-discharge power demand Pb* against the accumulated charge ratio SOC as a charge-discharge power demand setting map and reads the charge-discharge power demand Pb* corresponding to the given accumulated charge ratio SOC from this charge-discharge power demand setting map. One example of the charge-discharge power demand setting map is shown in FIG. 13. In this embodiment as shown in the figure, a small dead band is prepared with a control center accumulated charge ratio Scnt as the center, and a charge-discharge power demand Pb* to discharge the master battery 50 is set against a larger accumulated charge ratio SOC than ratios in the dead band, while a charge-discharge power demand Pb* to charge the master battery 50 is set against a smaller accumulated charge ratio SOC than ratios in the dead band. The control center accumulated charge ratio Scnt is set to the same value as the threshold value Shv when the hybrid travel shift flag Fhv is set to value '1' to set the hybrid travel priority mode as the travel mode for the reason that the accumulated charge ratio SOC becomes less than the threshold value Shv during the vehicle travelling in the motor travel priority mode. The control center accumulated charge ratio Scnt is set to the accumulated charge ratio SOC at the time of setting the hybrid travel priority mode by operation of the EV cancel SW 89 when the hybrid travel priority mode is set by the driver's operation of the EV cancel SW 89. This setting of the control center accumulated charge ratio Scnt enables to maintain the accumulated charge ratio SOC at the time that the driver switches the EV cancel SW 89 to on.

The CPU 72 subsequently sets the power demand Pe* to be output from the engine 22 as the sum of the driving power Pdrv* and the charge-discharge power demand Pb* (step S615), and sets a preset power Phv, which is predetermined as a little larger power than the minimum power enabling efficient operation of the engine 22, into the threshold value Pstart for starting up the engine 22 (step S620). The CPU 72 determines whether the engine 22 is operated or the operation of the engine 22 is stopped (step S630). When the operation of the engine 22 is stopped, the CPU 72 determines whether the power demand Pe* is less than or equal to the threshold value Pstart (step S640). When the power demand Pe* is less than or equal to the threshold value Pstart, it is decided that the motor travel should be performed and the CPU 72 sets the torque command Tm1* of the motor MG1 to value '0' (step S650), while setting the torque command Tm2* of the motor MG2 by dividing the torque demand Tr* by the gear ratio Gr of the reduction gear 35 (step S652). The CPU 72 then sends the settings of the torque commands Tm1* and Tm2* to the motor ECU 40 (step S654), and this routine is terminated. This control enables the torque demand Tr* to be output from the motor MG2 to the ring gear shaft 32a or the drive shaft for driving the hybrid vehicle 20.

Upon determination that the power demand Pe* is more than the threshold value Pstart at the processing of step S640, the CPU 72 starts up the engine 22 (step S670), and the CPU 72 sets the target rotation speed Ne* and the target torque Te* of the engine 22 based on the operation curve (see FIG. 11) of the engine 22 to ensure efficient operation of the engine 22 and the power demand Pe* (step S680). The CPU 72 calculates the target rotation speed Nm1* of the motor MG1 according to Equation (4) given above, while calculating the torque command Tm1* of the motor MG1 according to Equation (5) (step 682). The CPU 72 calculates the torque command Tm2* of the motor MG2 according to Equation (6) (step S684), and sends the settings of the target rotation speed Ne* and the target torque Te* of the engine 22 to the engine ECU 24 and the settings of the torque commands Tm1* and Tm2* of the motors MG1 and MG2 to the motor ECU 40 (step S686). This routine is then terminated. This control enables the driving power Pdrv* and the charge-discharge power demand Pb* for charge and discharge of the master battery 50 to be output efficiently from the engine 22 to output the torque demand Tr* to the ring gear shaft 32a or the driveshaft for driving the hybrid vehicle 20.

When it is determined that the engine 22 is in operation at the processing of step S630, the CPU 72 compares the driving power Pdrv* with a value obtained by subtracting a preset power γ as a margin from the threshold value Pstart (step S660). The preset power γ is, as with the preset power α described above, for having hysteresis to avoid frequent start and stop of the engine 22 while the driving power Pdrv* is near the threshold value Pstart. The preset power γ may be the same value as the preset power α or a different value from the preset power α. When the driving power Pdrv* is more than the value obtained by subtracting the preset power γ from the threshold value Pstart, it is decided that travelling with power from the engine 22 should be continued. The CPU 72 sets the target rotation speed Ne* and the target rotation torque Te* of the engine 22 and the torque commands Tm1* and Tm2* of the motors MG1 and MG2 to output the torque demand Tr* to the ring gear shaft 32a or the driveshaft for driving the hybrid vehicle 20 while outputting the driving power Pdrv* and the charge-discharge power demand Pb* efficiently from the engine 22, and sends the settings to the engine ECU 24 and the motor ECU 40 (step S680 through S686). This routine is then terminated. When the driving power Pdrv* is less than the value obtained by subtracting the preset power γ from the threshold value Pstart, the operation of the engine 22 is stopped (step S690). The CPU 72 sets the torque command Tm1* of the motor MG1 to value '0' to perform the motor travel and sets the torque command Tm2* to the torque demand Tr* divided by the gear ratio Gr of the reduction gear 35 and sends the settings of the torque commands Tm1* and Tm2* to the motor ECU 40 (steps S650 through S654). This routine is then terminated.

In the hybrid vehicle 20 of the embodiment described above, in the case that there is the charge record of the charger 90 at the system startup, the motor travel priority mode is set as the travel mode when the accumulated charge ratio SOC is more than or equal to the threshold value Sev, and the hybrid travel priority mode is set as the travel mode when the accumulated charge ratio SOC is less than the threshold value Sev. In the case that there is no charge record of the charger 90 at the system startup, the travel mode is set in the same way as the case that there is the charge record of the charger 90 when the hybrid travel shift flag Fhv is equal to value '0', and the hybrid travel priority mode is set as the travel mode when the hybrid travel shift flag Fhv is equal to value '1'. This setting of the travel mode enables to set the motor travel priority mode in the case that the hybrid vehicle 20 is able to perform the motor travel to some extent of time or distance, and enables to set the hybrid travel priority mode in the case that the hybrid vehicle 20 should be switched to be driven in the hybrid travel priority mode after the hybrid vehicle 20 is driven in the motor travel priority mode for a short time or distance even when the motor travel priority mode is set for driving the hybrid vehicle 20, also in the case when the accumulated charge ratio SOC reaches a ratio which is not appropriate to the motor travel. That is to say, it is enabled more appropriately to set the travel mode at the system startup. In addition, the travel mode is set regardless of the state (on or off state) of the EV cancel SW 89 at the system startup, it is thus enabled to set the default travel mode at the system startup regardless of the driver's operation of the EV cancel SW 89 before the system shutdown. It is thus enabled to cope with the case that the driver forgets to switch the EV cancel SW 89 off after switching the EV cancel SW 89 on. The EV cancel SW 89 may be switched off as an initial state at the system startup.

In addition, in the hybrid vehicle 20 of the embodiment, after the setting of the travel mode at the system startup, the motor travel priority mode is continued until the accumulated charge ratio SOC becomes less than the threshold value Shv (for example, 20% or 30%) that is predetermined to enable starting up the engine 22 adequately, and the hybrid travel shift flag Fhv is set to value '1' and the hybrid travel priority mode is set as the travel mode when the accumulated charge ratio SOC becomes less than the threshold value Shv. This arrangement enables to lower the accumulated charge ratio SOC as much as possible by the system shutdown, and enables to switch the travel mode to the hybrid travel priority mode at a more appropriate timing. Furthermore, switching between the hybrid travel priority mode and the motor travel priority mode is performed according to the driver's operation of the EV cancel SW 89 in the motor travel priority mode, and the control to maintain the accumulated charge ratio SOC is performed when switching to the hybrid travel priority mode is done. This arrangement enables to set the travel mode reflecting the driver's intention, and enables to put the accumulated charge ratio SOC aside for driving in areas where only the motor travel is permitted for the natural environment or the urban environment.

In addition, in the hybrid vehicle 20 of the embodiment described above, upon setting the motor travel priority mode as the travel mode, the driving power Pdrv* is compared with the threshold value Pstart as a value (kw·Wout) obtained from multiplying the output limit Wout by the preset conversion factor kw, and the hybrid vehicle 20 performs the motor travel with operation stop of the engine 22 when the driving power Pdrv* is less than or equal to the threshold value Pstart, while the hybrid vehicle 20 is driven to travel with power from the engine 22 when the driving power Pdrv* is more than the threshold value Pstart. The accumulated charge ratio SOC is thus effectively decreased before the system shutdown. Accordingly, fuel efficiency and energy efficiency in the hybrid vehicle 20 is effectively enhanced. In addition, upon setting the hybrid travel priority mode as the travel mode, the power demand Pe* as the sum of the driving power Pdrv* and the charge-discharge power demand Pb* is compared with the threshold value Pstart as the preset power Phv which is predetermined as a little larger power than the minimum power enabling efficient operation of the engine 22, and the hybrid vehicle 20 performs the motor travel with operation stop of the engine 22 when the power demand Pe* is less than or equal to the threshold value Pstart, while the hybrid vehicle 20 is driven to travel with power from the engine 22 when the power demand Pe* is more than the threshold value Pstart. The hybrid vehicle 20 is thus efficiently driven. Furthermore, the control is performed with the setting of the charge-discharge power demand Pb* to maintain the accumulated charge ratio SOC. The accumulated charge ratio SOC at the time when the EV cancel SW 89 is switched off after the vehicle driving in the hybrid travel priority mode with the state of the EV cancel SW 89 on, is enabled to be kept as the value at the time when the EV cancel SW 89 is switched on. As a result, it is enabled to put the accumulated charge ratio SOC aside for driving in areas where only the motor travel is permitted for the natural environment or the urban environment.

In the hybrid vehicle 20 of the embodiment, in the case that there is no charge record of the charger 90 at the system startup, the travel mode is set in the same way as the case that there is the charge record when the hybrid travel shift flag Fhv is equal to value '0', and the hybrid travel priority mode is set as the travel mode when the hybrid travel shift flag Fhv is equal to value '1'. This is not essential. When there is no charge record at the system startup and the hybrid travel shift flag Fhv is value '0', the motor travel priority mode may be set regardless of the accumulated charge ratio SOC. That is to say, when the system startup is performed without electric charge of the charger 90 after the system shutdown in the state that the motor travel priority mode is set, the motor travel priority mode is set straight. This arrangement enables to inherit automatically the motor travel priority mode from the system shutdown to the next system startup.

In the hybrid vehicle 20 of the embodiment, in the case that there is no charge record of the charger 90 at the system startup, the travel mode is set in the same way as the case that there is the charge record when the hybrid travel shift flag Fhv is equal to value '0', and the hybrid travel priority mode is set as the travel mode when the hybrid travel shift flag Fhv is equal to value '1'. This is not essential. When there is no charge record at the system startup and the hybrid travel shift flag Fhv is value '0', the travel mode may be set according to the accumulated charge ratio SOC. That is to say, the motor travel priority mode is set as the travel mode when the accumulated charge ratio SOC is more than or equal to the threshold value Shv, and the hybrid travel priority mode is set when the accumulated charge ratio SOC is less than the threshold value Shv. This arrangement enables to inherit automatically the motor travel priority mode from the system shutdown to the next system startup as much as possible.

Figure 14:
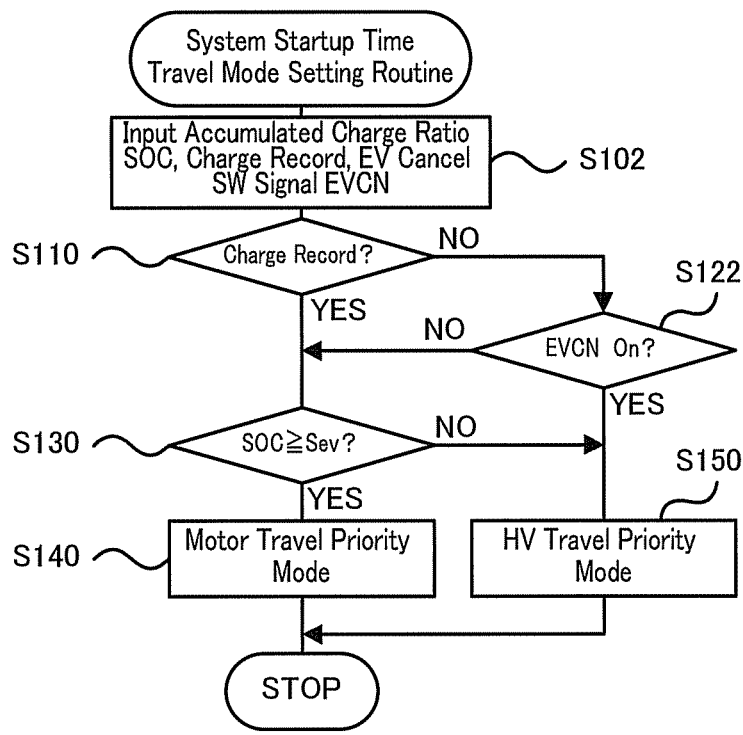
FIG. 14 is a flowchart showing a system startup time travel mode setting routine executed by the hybrid electronic control unit 70 in one modified example.

In the hybrid vehicle 20 of the embodiment, in the case that there is no charge record of the charger 90 at the system startup, the travel mode is set in the same way as the case that there is the charge record when the hybrid travel shift flag Fhv is equal to value '0', and the hybrid travel priority mode is set as the travel mode when the hybrid travel shift flag Fhv is equal to value '1'. This is not essential. When there is no charge record at the system startup, the travel mode may be set according to the state of the EV cancel SW 89. In this case, the system startup time travel mode setting routine of FIG. 14 may be executed instead of the system startup time travel mode setting routine of FIG. 2. In this routine, the processing of step S102 to input the accumulated charge ratio SOC, the charge record of the charger 90, and the EV cancel SW signal EVCN and the processing of step S122 to check the EV cancel SW signal EVCN are executed, instead of the processing of step S100 to input the accumulated charge ratio SOC and the charge record of the charger 90 and the processing of step S120 to check the value of the hybrid travel shift flag Flay in FIG. 2. That is to say, in the case that there is no charge record of the charger 90 at the system startup time, the CPU 72 checks the EV cancel SW signal EVCN input at the processing of step S102 (step S122). In the case that the EV cancel SW signal EVCN is off, the motor travel priority mode is set when the accumulated charge ratio SOC is more than or equal to the threshold value Sev (step S140), while the hybrid travel priority mode is set when the accumulated charge ratio SOC is less than the threshold value Sev (step S150), in the same way as the case that there is the charge record of the charger 90. In the case that the EV cancel SW signal EVCN is on, the hybrid travel priority mode is set (step S150). This routine is then terminated. This control enables to reflect the driver's intention of setting the travel mode to the travel mode at the system startup after the system shutdown. The processing in the case that there is no charge record of the charger 90 to set the motor travel priority mode when the accumulated charge ratio is more than or equal to the threshold value Sev, while the hybrid travel priority mode is set when the accumulated charge ratio SOC is less than the threshold value Sev, in the same way as the case that there is the charge record of the charger 90 in the routine of FIG. 2, is the same as the processing of FIG. 2 to set the travel mode regardless of the EV cancel SW signal EVCN when there is no charge record at the system startup.

Figure 15:
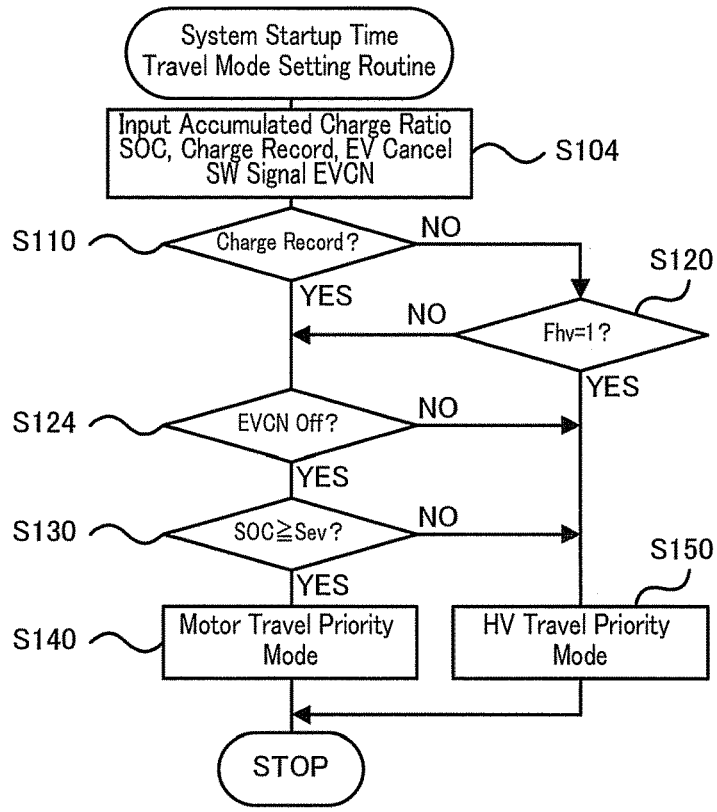
FIG. 15 is a flowchart showing a system startup time travel mode setting routine executed by the hybrid electronic control unit 70 in another modified example.

In the hybrid vehicle 20 of the embodiment, in the case that there is the charge record of the charger 90 at the system startup, the motor travel priority mode is set when the accumulated charge ratio SOC is more than or equal to the threshold value Sev, while the hybrid travel priority mode is set when the accumulated charge ratio SOC is less than the threshold value Sev. This is not essential. When there is the charge record of the charger 90 at the system startup, the travel mode may be set according to the EV cancel SW signal EVCN. In this case, the system startup time travel mode setting routine of FIG. 15 may be executed instead of the system startup time travel mode setting routine of FIG. 2. In this routine, the processing of step S104 to input the accumulated charge ratio SOC, the charge record of the charger 90, and the EV cancel SW signal EVCN is executed instead of the processing of step S100 of FIG. 2 to input the accumulated charge ratio SOC and the charge record of the charger 90, and the processing of step S124 to check the EV cancel SW signal EVCN is executed before the processing of step S130 of FIG. 2 to compare the accumulated charge ratio SOC with the threshold value Sev. That is to say, in the case that there is the charge record of the charger 90 at the system startup, the CPU 72 checks the EV cancel SW signal EVCN (step S124). In the case that EV cancel SW signal EVCN is off, the motor travel priority mode is set when the accumulated charge ratio SOC is more than or equal to the threshold value Sev (step S140), the hybrid travel priority mode is set when the accumulated charge ratio SOC is less than the threshold value Sev (step S150). In the case that EV cancel SW signal EVCN is on, the hybrid travel priority mode is set even in the case that there is the charge record (step S150). This routine is then terminated. This control enables to reflect the driver's intention of setting the travel mode to the travel mode at the system startup after the system shutdown. The processing in the case that there is the charge record of the charger 90 at the system startup and the EV cancel SW signal EVCN is off to set the motor travel priority mode when the accumulated charge ratio is more than or equal to the threshold value Sev, while the hybrid travel priority mode is set when the accumulated charge ratio SOC is less than the threshold value Sev, in the same way as the case that there is the charge record of the charger 90 in the routine of FIG. 2, is the same as the processing in the routine of FIG. 2 to set the travel mode regardless of the EV cancel SW signal EVCN when there is the charge record at the system startup.

Figure 16:
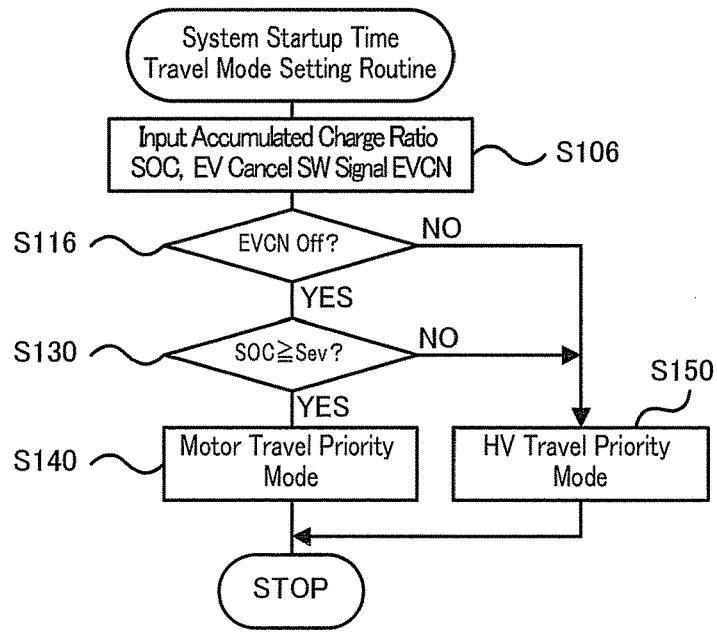
FIG. 16 is a flowchart showing a system startup time travel mode setting routine executed by the hybrid electronic control unit 70 in still another modified example.

In the hybrid vehicle 20 of the embodiment, the travel mode is set according to whether there is the charge record of the charger 90 at the system startup. Instead of the charge record, the travel mode may be set according to the EV cancel SW signal EVCN. In this case, the system startup time travel mode setting routine of FIG. 16 may be executed instead of the system startup time travel mode setting routine of FIG. 2. In this routine, the processing of step S106 to input the accumulated charge ratio SOC and the EV cancel SW signal EVCN is executed instead of the processing of step S100 of FIG. 2 to input the accumulated charge ratio SOC and the charge record of the charger 90. That is to say, at the system startup time, the CPU 72 checks the EV cancel SW signal EVCN (step S116). In the case that the EV cancel SW signal EVCN is off, the motor travel priority mode is set when the accumulated charge ratio SOC is more than or equal to the threshold value Sev (step S140), while the hybrid travel priority mode is set when the accumulated charge ratio SOC is less than the threshold value Sev (step S150). In the case that the EV cancel SW signal EVCN is on, the hybrid travel priority mode is set (step S150). This routine is then terminated. This control enables to reflect the driver's intention of setting the travel mode to the travel mode at the system startup after the system shutdown. The processing in the case that the EV cancel SW signal EVCN is on at the system startup to set the motor travel priority mode when the accumulated charge ratio is more than or equal to the threshold value Sev, while the hybrid travel priority mode is set when the accumulated charge ratio SOC is less than the threshold value Sev, in the same way as the case that there is the charge record of the charger 90 in the routine of FIG. 2, is the same as the processing in which the determination whether there is the charge record is excluded from the routine of FIG. 2 where the travel mode is set regardless of the EV cancel SW signal EVCN.

In the hybrid vehicle 20 of the embodiment, the travel mode is set according to whether there is the charge record of the charger 90. Instead, regardless of the charge record, the travel mode may be set according to the accumulated charge ratio SOC. That is to say, the motor travel priority mode may be set when the accumulated charge ratio SOC is more than or equal to the threshold value Sev, and the hybrid travel priority mode may be set when the accumulated charge ratio SOC is less than the threshold value Sev.

In the hybrid vehicle 20 of the embodiment, the master battery 50 and the slave batteries 60 and 62 are constructed as lithium-ion secondary batteries having the same rated capacity. This is not essential. They may be constructed as lithium-ion secondary batteries each having different rated capacity or different types of secondary batteries each having different rated capacity.

In the hybrid vehicle 20 of the embodiment, one master battery 50 and two slave batteries 60 and 62 are installed, but one master battery 50 and three or more slave batteries may be installed. In this case, when travelling with the motor travel priority mode, the master battery 50 may be connected to the side of the motors MG1 and MG2 and the three or more slave batteries may be sequentially connected to the side of the motors MG1 and MG2 as the connection state. In addition, one master battery and one slave battery may be installed, and two or more master batteries and two or more slave batteries may be installed. Only one single master battery may also be installed.

In the hybrid vehicle 20 of the embodiment, one master battery 50 and two slave batteries 60 and 62 are installed, and the master battery 50 and the slave battery 60 are connected to the side of the motors MG1 and MG2 in the first connection state, while the master battery 50 and the slave battery 62 are connected to the side of the motors MG1 and MG2 in the second connection state, when travelling with the motor travel priority mode. Instead, the master battery 50 and the slave battery 62 may be connected to the side of the motors MG1 and MG2 in the first connection state, while the master battery 50 and the slave battery 60 are connected to the side of the motors MG1 and MG2 in the second connection state.

In the hybrid vehicle 20 of the embodiment, when travelling with the motor travel priority mode, switching between the motor travel and the vehicle travelling with power from the engine 22 is done by comparing the driving power Pdrv* with the threshold value Pstart obtained from multiplying the output limit Wout by the preset conversion factor kw. This is not essential. Switching between the motor travel and the vehicle travelling with power from the engine 22 may be done by comparing the driving power Pdrv* with a smaller threshold value than the threshold value Pstart obtained from multiplying output limit Wout by the preset conversion factor kw.

Figure 17:
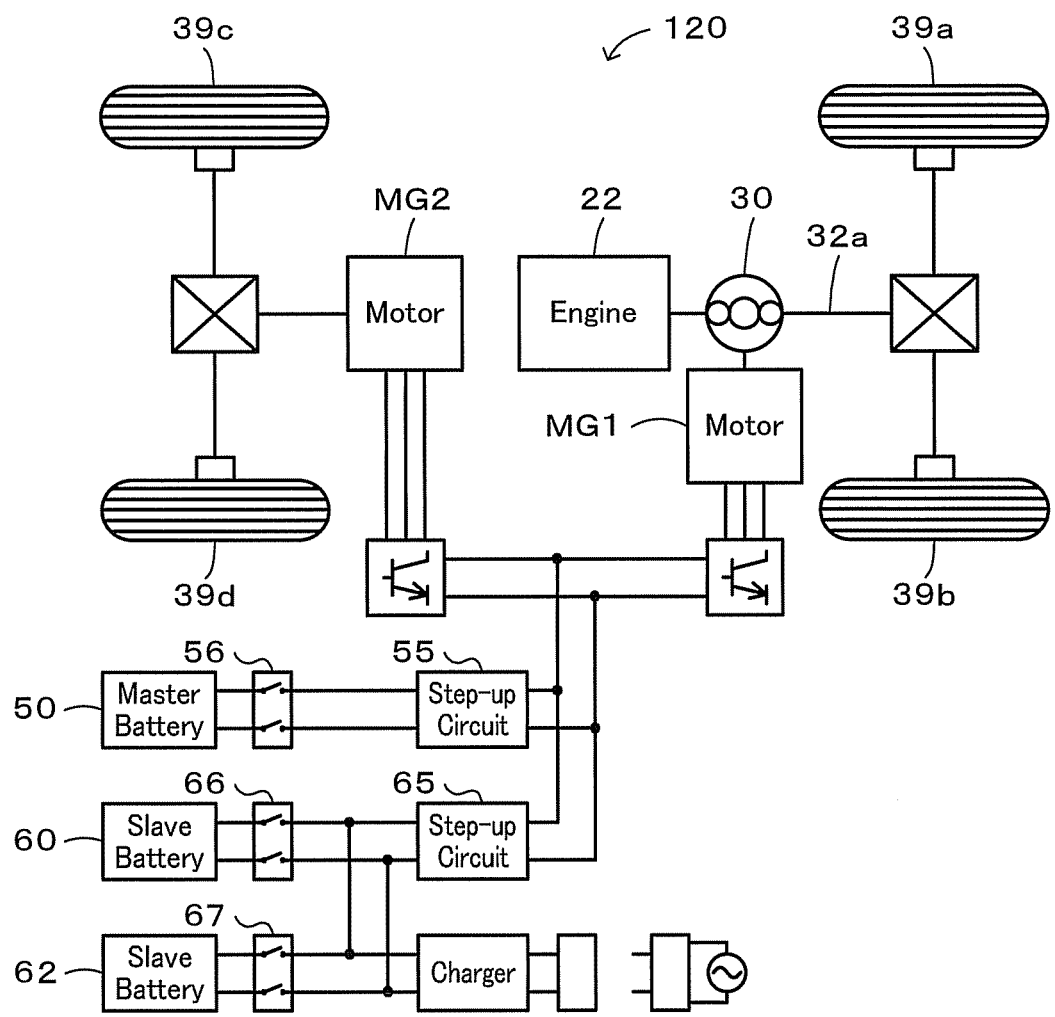
FIG. 17 schematically illustrates the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 17. In the hybrid vehicle 120 of FIG. 17, the power of the motor MG2 is output to another axle (an axle linked with wheels 39c and 39d) that is different from the axle connecting with the ring gear shaft 32a (the axle linked with the drive wheels 39a and 39b).

Figure 18:
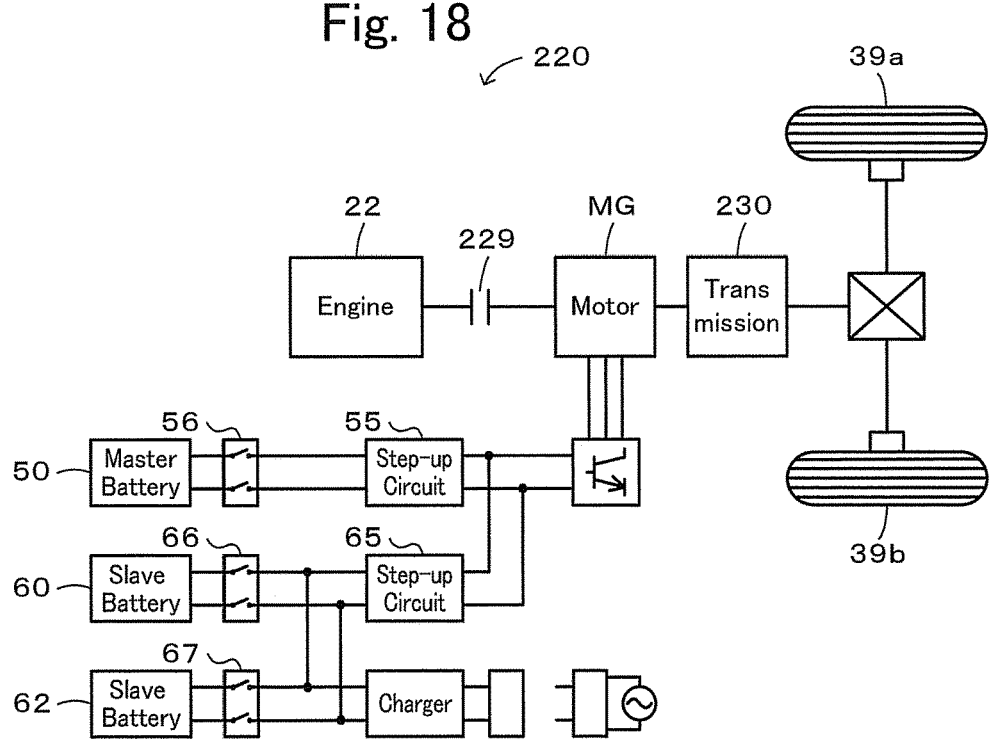
FIG. 18 schematically illustrates the configuration of still another hybrid vehicle 220 in another modified example.
Figure 19:
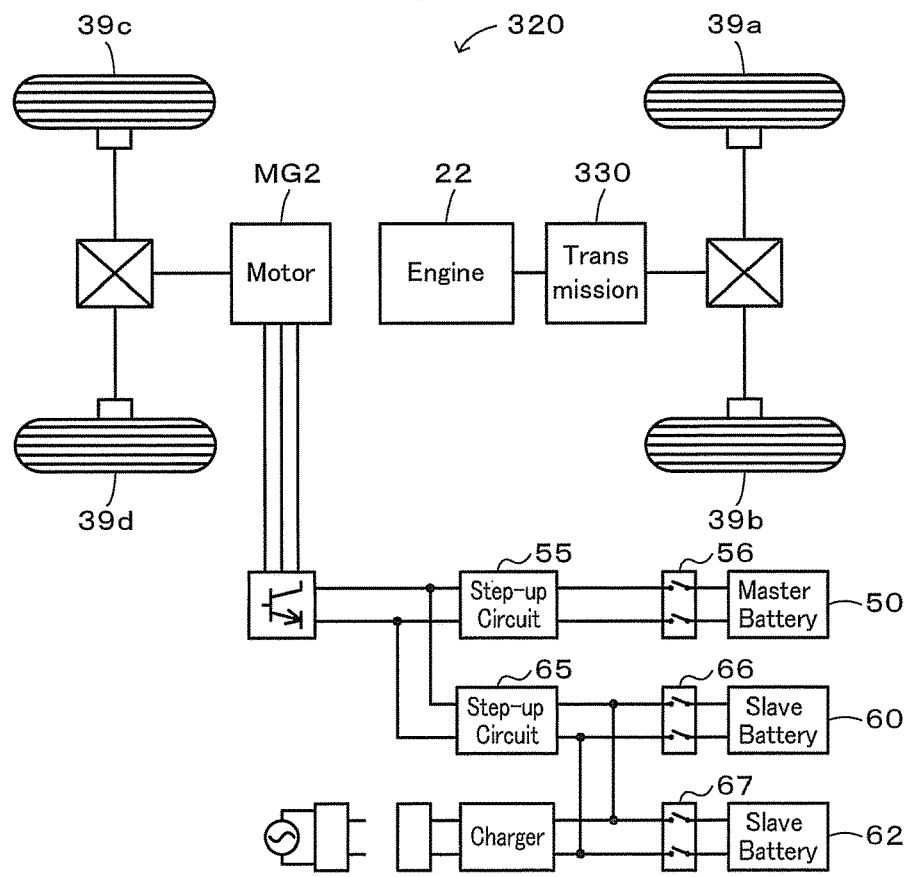
FIG. 19 schematically illustrates the configuration of another hybrid vehicle 320 instill another modified example.

In the hybrid vehicle 20 of the embodiment, the power from the engine 22 is output via the power distribution integration mechanism 30 to the ring gear shaft 32a or the driveshaft linked to the driving wheels 39a and 39b, and the power from the motor MG2 is output via the reduction gear 35 to the ring gear shaft 32a or the driveshaft. The technique of the invention is also applicable to a hybrid vehicle 220 of a modified structure shown in FIG. 18. In the hybrid vehicle 220 of FIG. 18, the motor MG is attached via a transmission 230 to a driveshaft linked to the driving wheels 39a and 39b and the engine 22 is connected via a clutch 229 to the rotating shaft of the motor MG. In this hybrid vehicle 220, the power from the engine 22 is output to the driveshaft via the rotating shaft of the motor MG and the transmission 230, and the power from the motor MG is output via the transmission 230 to the driveshaft. The technique of the invention is also applicable to a hybrid vehicle 320 of a modified structure shown in FIG. 19. In the hybrid vehicle 320 of FIG. 19, the power from the engine 22 is output via a transmission 330 to the axle linked with the driving wheels 39a and 39b, and the power from the motor MG is output to another axle (an axle linked with wheels 39c and 39d of FIG. 19) that is different from the axle linked with the driving wheels 39a and 39b. That is to say, the technique of the invention is applicable to any type of hybrid vehicles having an engine that outputs power for driving the vehicle, a motor that outputs power for driving the vehicle, a battery that supplies electric power to the motor, and a charger that charges the battery at system shutdown.

In the above embodiment, the invention is described using an application to a hybrid vehicle. The invention may be applied to a travel mode setting method of a hybrid vehicle.

The primary elements in the embodiment and its modified examples are mapped to the primary constituents in the claims of the invention as described below. The engine 22 in the embodiment corresponds to the 'internal combustion engine' in the claims of the invention. The motor MG2 in the embodiment corresponds to the 'motor' in the claims of the invention. The master battery 50 and the slave batteries 60 and 62 each constructed as a lithium-ion secondary battery in the embodiment corresponds to the 'secondary battery' in the claims of the invention. The charger 90 in the embodiment corresponds to the 'charger' in the claims of the invention. The battery ECU 52 calculating the accumulated charge amount SOC1 of the master battery 50 and the accumulated charge amounts SOC2 and SOC3 of the slave batteries 60 and 62 from integrated values of the charge-discharge currents Ib1, Ib2 and Ib3 measured by the current sensors 51b, 61b and 63b, while calculating the accumulated charge ratio SOC as a ratio of the sum of these to the sum of the whole capacity rate in the embodiment corresponds to the 'accumulated charge ratio calculation module' in the claims of the invention. The hybrid electronic control unit 70 executing the system startup time travel mode setting routine of FIG. 2 and the post-startup time travel mode setting routine of FIG. 3 in the embodiment corresponds to the 'travel mode setting module' in the claims of the invention. In the system startup time travel mode setting routine of FIG. 2, in the case that there is the charge record of the charger 90 at the system startup, the motor travel priority mode is set as the travel mode when the accumulated charge ratio SOC is more than or equal to the threshold value Sev, while the hybrid travel priority mode is set as the travel mode when the accumulated charge ratio SOC is less than the threshold value Sev. In the case that there is no charge record of the charger 90 at the system startup, the travel mode is set in the same way as the case that there is the charge record when the hybrid travel shift flag Fhv is equal to value '0', the hybrid travel priority mode is set as the travel mode when the hybrid travel shift flag Fhv is equal to value '1'. In the post-startup time travel mode setting routine of FIG. 3, after setting the travel mode at the system startup, the motor travel priority mode is continued until the accumulated charge ratio SOC becomes less than the threshold value Shv, the hybrid travel shift flag Fhv is set to value '1' and the hybrid travel priority mode is set as the travel mode when the accumulated charge ratio SOC becomes less than the threshold value Shv, and switching between the hybrid travel priority mode and the motor travel priority mode is performed according to the operation of the EV cancel SW 89 when the driver operates the EV cancel SW 89 in the motor travel priority mode. The combination of the hybrid electronic control unit 70, the engine ECU, and the motor ECU 40 in the embodiment corresponds to the 'control module' in the claims of the invention. The hybrid electronic control unit 70 executes the motor travel priority drive control routine of FIG. 7 in the motor travel priority mode and executes the hybrid travel priority drive control routine of FIG. 8 in the hybrid travel priority mode. The engine ECU 24 receives control signals sent from the hybrid electronic control unit 70 to start up the engine 22, to stop the operation of the engine 22, and to control the engine 22 to be driven with the received target rotation speed Ne* and the target torque Te* sent from the hybrid electronic control unit 70. The motor ECU 40 controls the inverters 41 and 42 to drive the motor MG1 and MG2 with the received torque commands Tm1* and Tm2* sent from the hybrid electronic control unit 70. The EV cancel SW 89 to cancel the motor travel priority mode and set the hybrid travel priority mode in the embodiment corresponds to the 'hybrid setting cancellation instruction module' in the claims of the invention.

The 'internal combustion engine' is not restricted to the engine 22 designed to consume a hydrocarbon fuel, such as gasoline or light oil, and thereby output power, but may be an internal combustion engine of any other design, for example, a hydrogen engine. The 'motor' is not restricted to the motor MG2 constructed as a synchronous motor generator but may be any type of motor constructed to input and output power to a driveshaft, for example, an induction motor. The 'secondary battery' is not restricted to the battery 50 and the slave batteries 60 and 62 each constructed as a lithium-ion secondary battery but may be any other thing including one secondary battery designed to transmit electric power to and from the motor, for example, a combination having one master battery and three or more slave batteries, a combination having one master battery and one slave battery, a combination having two or more master batteries and two or more slave batteries, a single master battery, and secondary batteries other than lithium-ion batteries such as nickel metal hydride secondary batteries, nickel cadmium secondary batteries, and lead acid secondary batteries. The 'charger' is not restricted to the charger 90 including a charging relay, an AC-to-DC converter, and a DC-to-DC converter but may be any other charger that is connected to an external power supply in a system shutdown state of the hybrid vehicle to charge the secondary battery with electric power from the external power supply. The 'accumulated charge ratio calculation module' is not restricted to the arrangement of calculating the accumulated charge amount SOC1 of the master battery 50 and the accumulated charge amounts SOC2 and SOC3 of the slave batteries 60 and 62 from integrated values of the charge-discharge currents Ib1, Ib2 and Ib3 measured by the current sensors 51b, 61b and 63b, while calculating the accumulated charge ratio SOC as a ratio of the sum of these to the sum of the whole capacity rate, but may be any other arrangement of calculating an accumulated charge ratio that is a ratio of an accumulated charge amount in the secondary battery to a whole capacity of the secondary battery, for example, an arrangement of measuring the open-circuit voltages of the master battery 50 and the slave batteries 60 and 62 to calculate the accumulated charge amounts SOC1, SOC2 and SOC3 based on the measured open-circuit voltages, while calculating the accumulated charge ratio SOC as a ratio of the sum of these to the sum of the whole capacity rate. The 'mode setting module' is not restricted to the below arrangement. In the case that there is the charge record of the charger 90 at the system startup, the motor travel priority mode is set as the travel mode when the accumulated charge ratio SOC is more than or equal to the threshold value Sev, while the hybrid travel priority mode is set as the travel mode when the accumulated charge ratio SOC is less than the threshold value Sev. In the case that there is no charge record of the charger 90 at the system startup, the travel mode is set in the same way as the case that there is the charge record when the hybrid travel shift flag Fhv is equal to value '0', the hybrid travel priority mode is set as the travel mode when the hybrid travel shift flag Fhv is equal to value '1'. After setting the travel mode at the system startup, the motor travel priority mode is continued until the accumulated charge ratio SOC becomes less than the threshold value Shv, the hybrid travel shift flag Fhv is set to value '1' and the hybrid travel priority mode is set as the travel mode when the accumulated charge ratio SOC becomes less than the threshold value Shv, and switching between the hybrid travel priority mode and the motor travel priority mode is performed according to the operation of the EV cancel SW 89 when the driver operates the EV cancel SW 89 in the motor travel priority mode. The 'mode setting module' may be any other arrangement of setting a hybrid travel priority mode where the hybrid travel is prioritized for driving the hybrid vehicle as the travel mode when the calculated accumulated charge ratio is less than the first preset ratio at the system startup of the hybrid vehicle in which the secondary battery is charged by the charger after the system shutdown of the hybrid vehicle, setting the hybrid travel priority mode as the travel mode when the accumulated charge ratio becomes less than a second preset ratio that is less than the first preset ratio while the hybrid vehicle is driven in the motor travel priority mode, setting the motor travel priority mode as the travel mode at the system startup of the hybrid vehicle in which the secondary battery is not charged by the charger after the system shutdown of the hybrid vehicle in which the motor travel priority mode is set as the travel mode, and setting the hybrid travel priority mode as the travel mode regardless of the calculated accumulated charge ratio at the system startup of the hybrid vehicle in which the secondary battery is not charged by the charger after the system shutdown of the hybrid vehicle in which the hybrid travel priority mode is set as the travel mode according to the calculated accumulated charge ratio becoming less than the second preset ratio. The 'mode setting module' may be, for example, any one of arrangements below described. As an example, when there is no charge record at the system startup and the hybrid travel shift flag Fhv is value '0', the motor travel priority mode may be set regardless of the accumulated charge ratio SOC. As another example, when there is no charge record at the system startup and the hybrid travel shift flag Fhv is value '0', the travel mode may be set according to the accumulated charge ratio SOC. That is to say, the motor travel priority mode is set as the travel mode when the accumulated charge ratio SOC is more than or equal to the threshold value Shv, and the hybrid travel priority mode is set when the accumulated charge ratio SOC is less than the threshold value Shv. As still another example, in the case that there is no charge record of the charger 90 at the system startup time and the EV cancel SW signal EVCN is off, the motor travel priority mode is set when the accumulated charge ratio SOC is more than or equal to the threshold value Sev, while the hybrid travel priority mode is set when the accumulated charge ratio SOC is less than the threshold value Sev, in the same way as the case that there is the charge record of the charger 90. In the case that there is no charge record of the charger 90 at the system startup time and the EV cancel SW signal EVCN is on, the hybrid travel priority mode is set. As still another example, in the case that there is the charge record of the charger 90 at the system startup and the EV cancel SW signal EVCN is off, the motor travel priority mode is set when the accumulated charge ratio SOC is more than or equal to the threshold value Sev, and the hybrid travel priority mode is set when the accumulated charge ratio SOC is less than the threshold value Sev. In the case that there is the charge record of the charger 90 at the system startup and the EV cancel SW signal EVCN is on, the hybrid travel priority mode is set even when there is the charge record. As still another example, in the case that the EV cancel SW signal EVCN is off at the system startup time, regardless of the charge record, the motor travel priority mode is set when the accumulated charge ratio. SOC is more than or equal to the threshold value Sev, while the hybrid travel priority mode is set when the accumulated charge ratio SOC is less than the threshold value Sev. In the case that the EV cancel SW signal EVCN is on at the system startup, regardless of the charge record, the hybrid travel priority mode is set. As still another example, regardless of the charge record and the EV cancel SW signal EVCN, the travel mode may be set according to the accumulated charge ratio SOC. That is to say, the motor travel priority mode may be set when the accumulated charge ratio SOC is more than or equal to the threshold value Sev, and the hybrid travel priority mode may be set when the accumulated charge ratio SOC is less than the threshold value Sev. The 'control module' is not restricted to the combination of the hybrid electronic control unit 70 with the engine ECU 24 and the motor ECU 40 but may be actualized by a single electronic control unit. The 'control module' is not restricted to the arrangement of executing the motor travel priority drive control routine of FIG. 7 in the motor travel priority mode and the hybrid travel priority drive control routine of FIG. 8 in the hybrid travel priority mode, but may be any other arrangement of, controlling the internal combustion engine and the motor so that the hybrid vehicle is driven in the set travel mode. The 'hybrid setting cancellation instruction module' is not restricted to the EV cancel SW 89 but may be any other configuration of giving instructions for a hybrid setting that is a setting of the hybrid travel priority mode and a cancellation of the hybrid setting.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the hybrid vehicles.

The invention claimed is:

1. A hybrid vehicle, having an internal combustion engine capable of outputting power for driving the hybrid vehicle, a motor constructed to input and output power for driving the hybrid vehicle, a secondary battery designed to transmit electric power to and receive electric power from the motor, and a charger connected to an external power supply in a system shutdown state of the hybrid vehicle to charge the secondary battery with electric power from the external power supply, the hybrid vehicle being capable of motor travel where the hybrid vehicle is driven only with input and output power to and from the motor and hybrid travel where the hybrid vehicle is driven with output power from the internal combustion engine and with the input and output power to and from the motor, the hybrid vehicle comprising:
an accumulated charge ratio calculation module configured to calculate an accumulated charge ratio that is a ratio of an accumulated charge amount in the secondary battery to a whole capacity of the secondary battery;
a travel mode setting module configured to:
  receive an ignition signal from an ignition switch in order to determine whether the hybrid vehicle is at a state after system shutdown or at system startup,
  set, prior to a most recent system shutdown, a hybrid travel shift flag to a first value when an accumulated charge ratio is less than a second preset ratio and set, during the most recent system shutdown, the hybrid travel shift flag to a second value when charging of the charger is performed,
  at system startup, the following options are available:
    (A) a motor travel priority mode where the motor travel is prioritized for driving the hybrid vehicle as a travel mode if the calculated accumulated charge ratio is more than or equal to a first preset ratio at system startup of the hybrid vehicle and a determination of a charge record of the secondary battery by the charger is affirmative during the most recent system shutdown and prior to the most recent system startup of the hybrid vehicle,
    (B) a hybrid travel priority mode where the hybrid travel is prioritized for driving the hybrid vehicle as the travel mode if the calculated accumulated charge ratio is less than the first preset ratio at the system startup of the hybrid vehicle and the determination of the charge record of the secondary battery by the charger is affirmative during the most recent system shutdown and prior to the most recent system startup of the hybrid vehicle,
    (C) the motor travel priority mode as the travel mode at the system startup of the hybrid vehicle if the determination of the charge record of the secondary battery by the charger is negative during the most recent system shutdown and prior to the most recent system startup of the hybrid vehicle and the hybrid travel shift flag is the second value, and
    (D) the hybrid travel priority mode as the travel mode regardless of the calculated accumulated charge ratio at the system startup of the hybrid vehicle if the determination of the charge record of the secondary battery by the charger is negative during the most recent system shutdown and prior to the most recent system startup of the hybrid vehicle and the hybrid travel shift flag is the first value; and
  select, at the system startup, one of the options (A), (B), (C), or (D), and set the selected option as the travel priority mode,
  set, after the system startup, the hybrid travel priority mode as the travel mode when the accumulated charge ratio is less than the second preset ratio while the hybrid vehicle is driven in the motor travel priority mode, wherein the second preset ratio is less than the first preset ratio, and
a control module configured to control the internal combustion engine and the motor so that the hybrid vehicle is driven in the set travel mode.

2. The hybrid vehicle in accordance with claim 1, wherein the travel mode setting module is configured to set the hybrid travel priority mode as the travel mode if the calculated accumulated charge ratio is less than a third preset ratio at the system startup of the hybrid vehicle, if the determination of the charge record of the secondary battery by the charger is negative after the system shutdown of the hybrid vehicle, and if the hybrid travel shift flag is the second value.

3. The hybrid vehicle in accordance with claim 2, wherein the third preset ratio is either the first preset ratio or the second preset ratio.

4. The hybrid vehicle in accordance with claim 1, the hybrid vehicle further comprising:
   a hybrid setting cancellation instruction module configured to give instructions for a hybrid setting that is a setting of the hybrid travel priority mode and for a cancellation of the hybrid setting,
   wherein the travel mode setting module is configured to set the hybrid travel priority mode as the travel mode once the instruction for the hybrid setting is given by the hybrid setting cancellation instruction module while the hybrid vehicle is driven in the motor travel priority mode, and set the motor travel priority mode as the travel mode once the instruction for the cancellation of the hybrid setting is given by the hybrid setting cancellation instruction module while the hybrid vehicle is driven in the hybrid travel priority mode according to the instruction for the hybrid setting by the hybrid setting cancellation instruction module.

5. The hybrid vehicle in accordance with claim 4, wherein the travel mode setting module is configured to, at the system startup of the hybrid vehicle, set the motor travel priority mode as the travel mode if the calculated accumulated charge ratio is more than or equal to the first preset ratio, while setting the hybrid travel priority mode as the travel mode if the calculated accumulated charge ratio is less than the first preset ratio, and if the determination of the charge record of the secondary battery by the charger is negative after the system shutdown, without the instruction for the cancellation of the hybrid setting by the hybrid setting cancellation instruction module, of the hybrid vehicle in which the hybrid travel shift flag is the first value according to the instruction for the hybrid setting by the hybrid setting cancellation instruction module.

6. The hybrid vehicle in accordance with claim 4, wherein the travel mode setting module is configured to set the hybrid travel priority mode as the travel mode at the system startup of the hybrid vehicle if the determination of the charge record of the secondary battery by the charger is negative after the system shutdown, without the instruction for the cancellation of the hybrid setting by the hybrid setting cancellation instruction module, of the hybrid vehicle in which the hybrid travel shift flag is the first value according to the instruction for the hybrid setting by the hybrid setting cancellation instruction module.

7. The hybrid vehicle in accordance with claim 4, wherein the travel mode setting module is configured to, at the system startup of the hybrid vehicle, set the motor travel priority mode as the travel mode if the calculated accumulated charge ratio is more than or equal to the first preset ratio, while setting the hybrid travel priority mode as the travel mode if the calculated accumulated charge ratio is less than the first preset ratio, if the determination of the charge record of the secondary battery by the charger is affirmative after the system shutdown, without the instruction for the cancellation of the hybrid setting by the hybrid setting cancellation instruction module, of the hybrid vehicle in which the hybrid travel shift flag is the first value according to the instruction for the hybrid setting by the hybrid setting cancellation instruction module.

8. The hybrid vehicle in accordance with claim 4, wherein the travel mode setting module is configured to set the hybrid travel priority mode as the travel mode at the system startup of the hybrid vehicle if the determination of the charge record of the secondary battery by the charger is affirmative after the system shutdown, without the instruction for the cancellation of the hybrid setting by the hybrid setting cancellation instruction module, of the hybrid vehicle in which the hybrid travel shift flag is the first value according to the instruction for the hybrid setting by the hybrid setting cancellation instruction module.

9. The hybrid vehicle in accordance with claim 4, wherein the travel mode setting module is configured to, at the system startup of the hybrid vehicle after the system shutdown, set the motor travel priority mode as the travel mode if the calculated accumulated charge ratio is more than or equal to the first preset ratio, while setting the hybrid travel priority mode as the travel mode if the calculated accumulated charge ratio is less than the first preset ratio, without the instruction for the cancellation of the hybrid setting by the hybrid setting cancellation instruction module, of the hybrid vehicle in which the hybrid travel shift flag is the first value according to the instruction for the hybrid setting by the hybrid setting cancellation instruction module.

10. The hybrid vehicle in accordance with claim 4, wherein the travel mode setting module is configured to set the hybrid travel priority mode as the travel mode at the system startup of the hybrid vehicle after the system shutdown, without the instruction for the cancellation of the hybrid setting by the hybrid setting cancellation instruction module, of the hybrid vehicle in which the hybrid travel shift flag is the first value according to the instruction for the hybrid setting by the hybrid setting cancellation instruction module.

* * * * *